United States Patent [19]
Warburton et al.

[11] Patent Number: 5,873,054
[45] Date of Patent: Feb. 16, 1999

[54] METHOD AND APPARATUS FOR COMBINATORIAL LOGIC SIGNAL PROCESSOR IN A DIGITALLY BASED HIGH SPEED X-RAY SPECTROMETER

[75] Inventors: William K. Warburton, 1300 Mills St., Menlo Park, Calif. 94025; Zhiquing (Carl) Zhou, Fremont, Calif.

[73] Assignee: William K. Warburton, Menlo Park, Calif.

[21] Appl. No.: 730,916

[22] Filed: Aug. 2, 1996

Related U.S. Application Data

[60] Provisional application No. 60/002,266 Aug. 14, 1995.
[51] Int. Cl.[6] .............................. G01N 23/00; G06F 19/00
[52] U.S. Cl. .............................. 702/190; 702/22; 702/27; 250/370.6; 378/91
[58] Field of Search ............................ 364/487, 481, 364/486, 527, 498; 324/307, 310, 316; 250/370.06, 370.09, 369, 336.1, 339.07, 308, 370.01, 305, 306, 366; 378/44, 45, 91; 702/22, 27, 190; 341/110, 143, 155

[56] References Cited

U.S. PATENT DOCUMENTS

| | | |
|---|---|---|
| 3,851,266 | 11/1974 | Conway . |
| 3,872,287 | 3/1975 | Koeman ............................ 235/151.31 |
| 3,894,219 | 7/1975 | Weigel . |
| 4,421,986 | 12/1983 | Friauf et al. ............................ 250/369 |
| 4,593,198 | 6/1986 | Pang et al. . |
| 4,642,811 | 2/1987 | Georgopoulos . |
| 4,658,216 | 4/1987 | Goulding et al. ........................ 328/109 |
| 4,692,626 | 9/1987 | Westphal .............................. 250/389 |
| 4,852,135 | 7/1989 | Anisovich et al. ........................ 378/49 |
| 5,005,146 | 4/1991 | Lakatos et al. . |
| 5,210,423 | 5/1993 | Arseneau . |
| 5,349,193 | 9/1994 | Mott et al. ................................ 702/22 |
| 5,392,042 | 2/1995 | Pellon ..................................... 341/143 |
| 5,524,133 | 6/1996 | Neale et al. ............................. 378/53 |
| 5,602,507 | 2/1997 | Suzuki . |

OTHER PUBLICATIONS

Takahashi, H. et al., "A new pulse height analysis system based on fast ADC digitizing technique," *IEEE Transactions on Nuclear Science*, pp. 626–629, vol. 40, No. 4, Aug. 1993.

Georgiev, A. et al., "An analog–to–digital conversion based on a moving window deconvolution," *IEEE Transactions on Nuclear Science*, pp. 1116–1124, vol. 41, No. 4, Aug. 1994.

Al–Haddad, M.N. et al., "Development and testing of a flash analog–to–digital converter based system for pulse shape discrimination of nuclear radiation pulses," *IEEE Transactions on Nuclear Science*, pp. 1765–1769, vol. 41, No. 5, Oct. 1994.

(List continued on next page.)

*Primary Examiner*—John Barlow
*Assistant Examiner*—Bryan Bui
*Attorney, Agent, or Firm*—Townsend and Townsend and Crew LLP

[57] ABSTRACT

A high speed, digitally based, signal processing system which accepts a digitized input signal and detects the presence of step-like pulses in the this data stream, extracts filtered estimates of their amplitudes, inspects for pulse pileup, and records input pulse rates and system livetime. The system has two parallel processing channels: a slow channel, which filters the data stream with a long time constant trapezoidal filter for good energy resolution; and a fast channel which filters the data stream with a short time constant trapezoidal filter, detects pulses, inspects for pileups, and captures peak values from the slow channel for good events. The presence of a simple digital interface allows the system to be easily integrated with a digital processor to produce accurate spectra at high count rates and allow all spectrometer functions to be fully automated. Because the method is digitally based, it allows pulses to be binned based on time related values, as well as on their amplitudes, if desired.

29 Claims, 11 Drawing Sheets

OTHER PUBLICATIONS

Farrow, R. et al., "X–ray signal processing electronics for solid state detectors," *Rev. Sci. Instrum.*, pp. 2307–2309, vol. 66, No. 2, Feb. 1995.

Jordanov, V.T. et al., "Digital pulse–shape analyzer based on fast sampling of an integrated charge pulse," *IEEE Transactions on Nuclear Science*, pp. 683–687, vol. 42, No. 4, Aug. 1995.

Jordanov, V.T. et al., "Digital techniques for real–time pulse shaping in radiation measurements," *Nuclear Instruments and Methods in Physics Research A* 353, pp. 261–264 (1994).

Mott, R.B. et al., "Improving EDS performance with digital pulse processing," *X–Ray Spectrometry in Electron Beam Instruments*, pp. 1–28 (D.B. Williams et al., New York, Plenum) (1994).

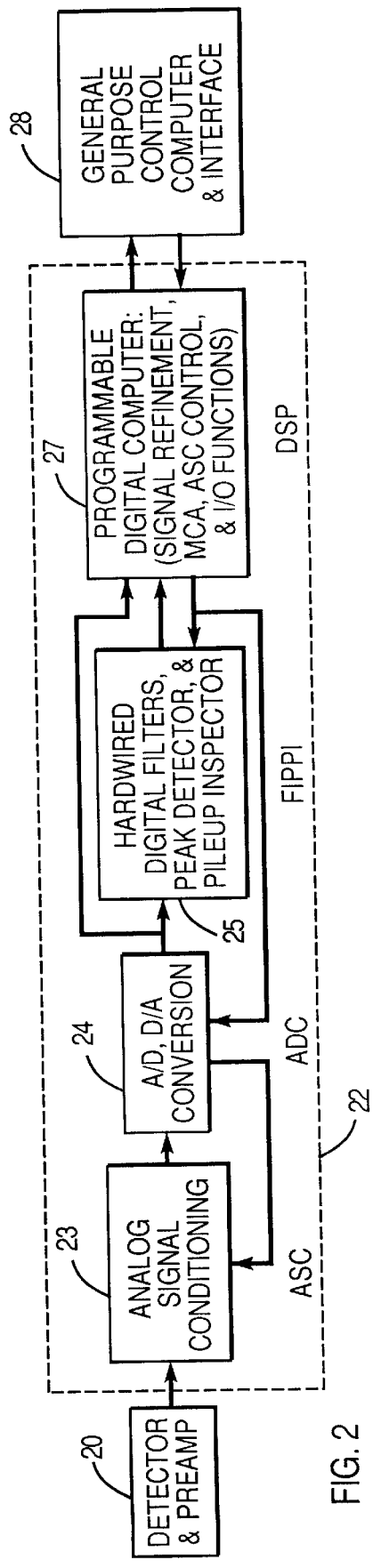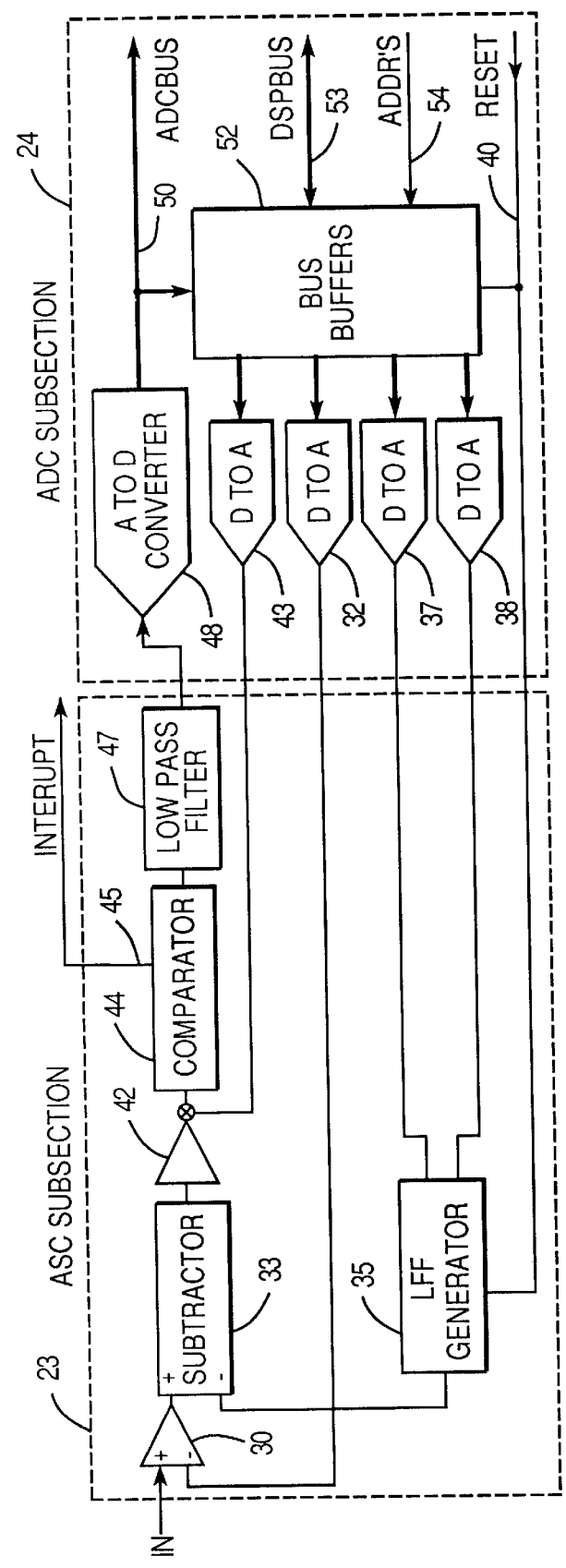
FIG. 2
FIG. 3

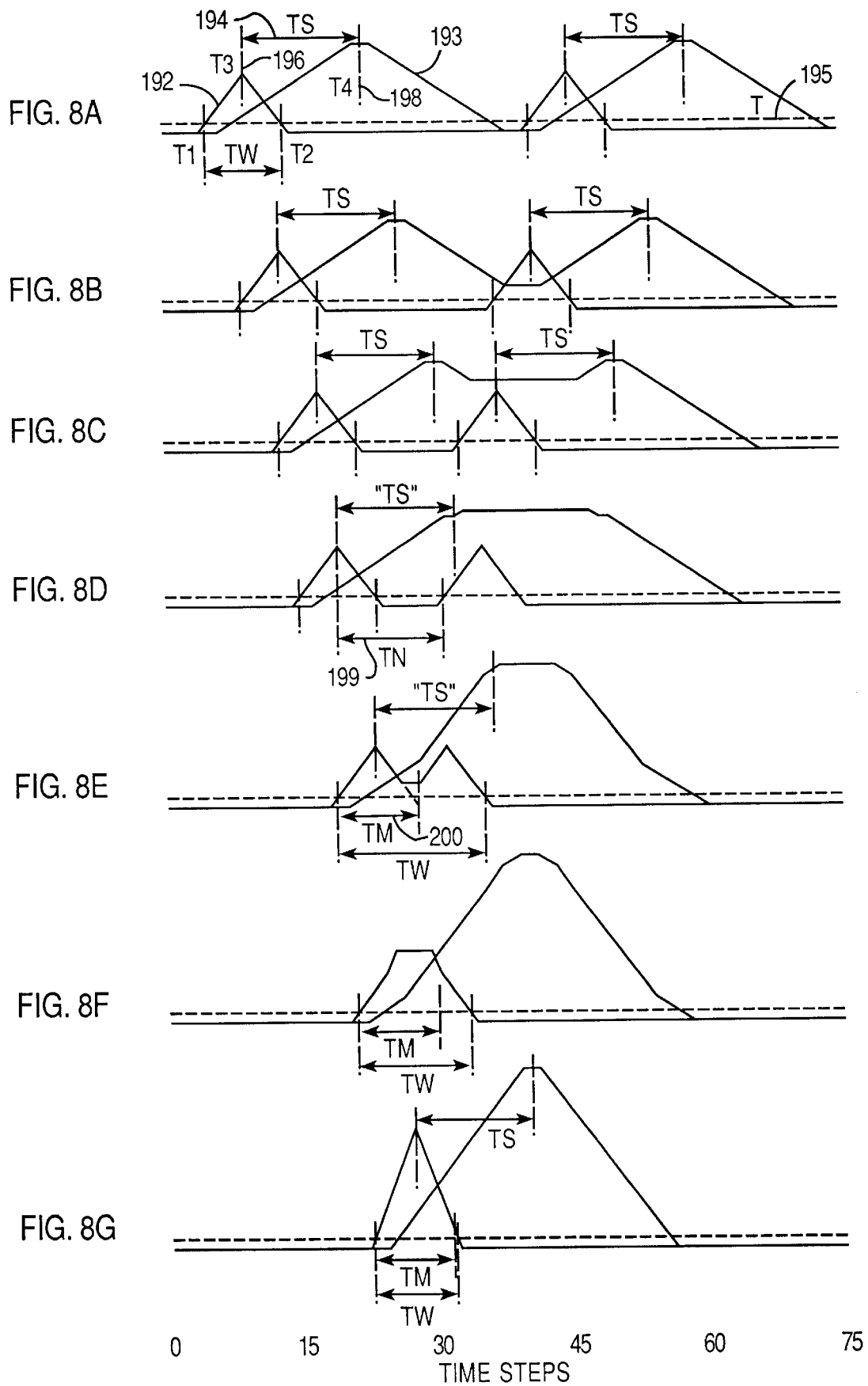

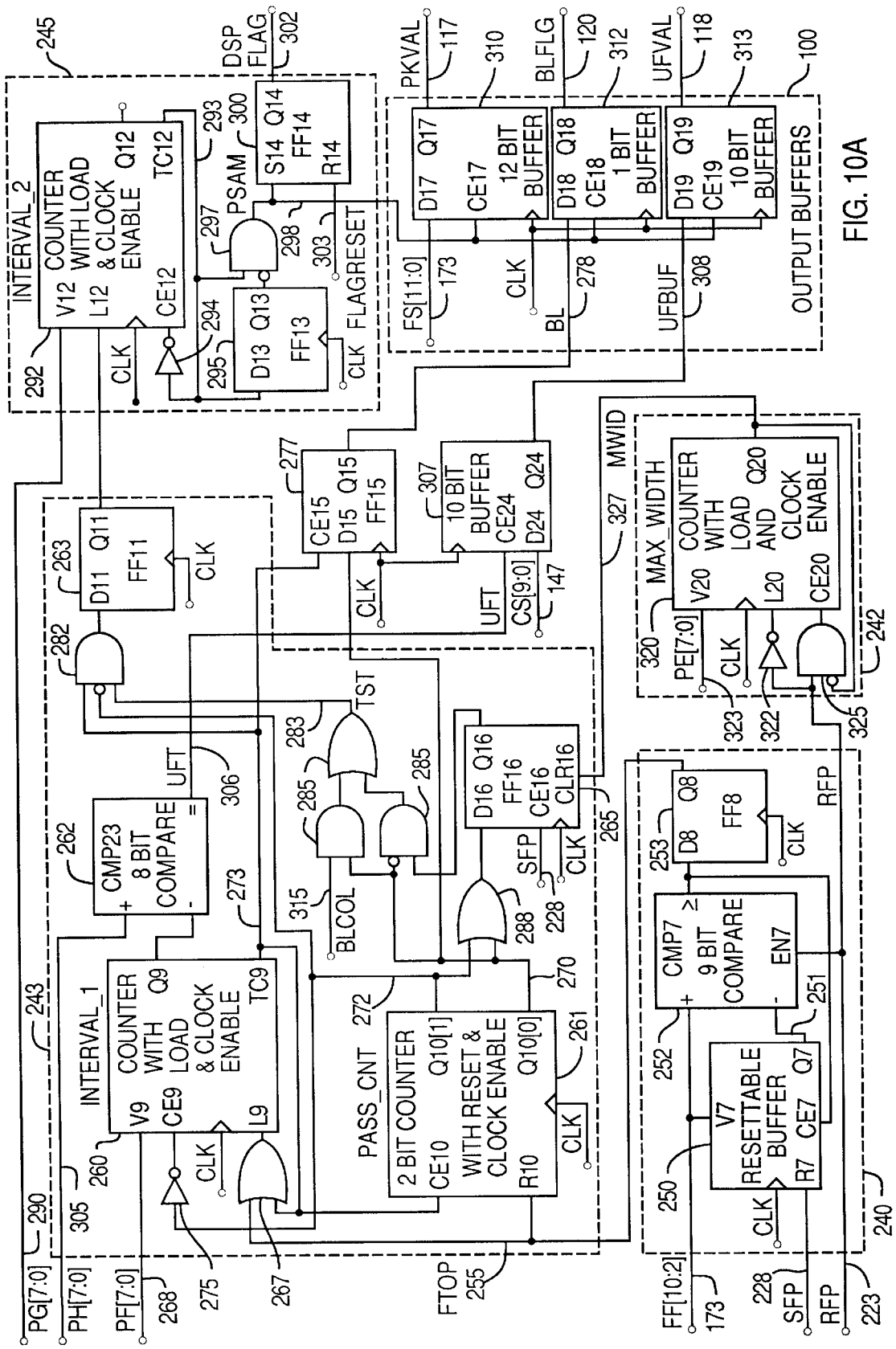

METHOD AND APPARATUS FOR COMBINATORIAL LOGIC SIGNAL PROCESSOR IN A DIGITALLY BASED HIGH SPEED X-RAY SPECTROMETER

GOVERNMENT RIGHTS

The U.S. Government has rights in this invention pursuant to Contract No. DE-FG03-92ER81311 awarded by the Department of Energy.

CROSS-REFERENCE TO RELATED APPLICATIONS

This application claims priority from, and is a continuation-in-part of, Provisional Application No. 60/002,266, filed Aug. 14, 1995, which Provisional Application is hereby incorporated by reference.

The following four commonly-owned copending applications, including this one, are being filed concurrently and the other three are hereby incorporated by reference into this one:

Application Ser. No. 08/702,327, filed Aug. 2, 1996, William K. Warburton and Bradley Hubbard entitled "METHOD AND APPARATUS FOR ANALOG SIGNAL CONDITIONER FOR HIGH SPEED, DIGITAL X-RAY SPECTROMETER" (Attorney Docket 17032-1-1);

Application Ser. No. 08/695,063, filed Aug. 2, 1996, now U.S. Pat. No. 5,684,850, William K. Warburton and Bradley Hubbard entitled "METHOD AND APPARATUS FOR DIGITALLY BASED HIGH SPEED X-RAY SPECTROMETER" (Attorney Docket 17032-1-2);

Application Ser. No. 08/695,062, filed Aug. 2, 1996, now U.S. Pat. No. 5,774,522, William K. Warburton entitled "METHOD AND APPARATUS FOR DIGITALLY BASED HIGH SPEED X-RAY SPECTROMETER FOR DIRECT COUPLED USE WITH CONTINUOUS DISCHARGE PREAMPLIFIERS" (Attorney Docket 17032-1-3); and Application Ser. No. 08/730,916, filed Aug. 2, 1996, William K. Warburton and Carl Zhou entitled "METHOD AND APPARATUS FOR COMBINATORIAL LOGIC SIGNAL PROCESSOR IN DIGITALLY BASED HIGH SPEED X-RAY SPECTROMETER" (Attorney Docket 17032-1-4).

BACKGROUND OF THE INVENTION

The present invention relates generally to systems for digitally processing the pulses generated in detector systems in response to absorbed radiation and, more particularly, to processing such pulses in low cost, high resolution, high rate spectrometers for x-rays or gamma rays.

There is a need, in very high counting rate applications such as synchrotron radiation research, for improved x-ray spectrometers. In many of these applications it is desired to detect and count x-rays of one particular energy under conditions where these x-rays of interest are greatly outnumbered by x-rays of a different but nearby energy. A typical example would include X-ray Absorption Spectroscopy (XAS) of dilute metallo-protein solutions, where elastically scattered incident x-rays (noise events) greatly outnumber the fluorescence x-rays (signal events) from the metal atoms of interest. Since the x-ray spectrometer's total count rate capability is limited by energy resolution considerations, it spends most of its time processing noise events, which limits the acquisition rate of good signal events. Under these conditions it is advantageous to employ multiple detector systems to increase the good signal acquisition rate. Commercial spectrometers with 13 channels are now commonly sold and many researchers are considering systems with up to 100 channels. This approach is limited by several factors, including cost, lack of high count rate capability with pileup inspection, the lack of an energy resolved analysis of the spectrum seen by each detector, the practical difficulties associated with retuning the processing electronics for a large number of detector channels, and, often, the sheer bulk of the required electronics.

Cost is an important issue because of the large number of detector channels to be implemented. Typical instrumentation for a single detector channel using a high quality analog spectroscopy amplifier and energy spectrum analyzer ("multi-channel analyzer" or MCA) costs approximately $6,000. The cost of outfitting the desired 100 channels is thus prohibitively expensive for the great majority of researchers. Because of price and counting rate considerations, usually only a energy window analysis ("single channel analyzer" or SCA) is used, even for systems with only a few detectors.

The throughput, or maximum countrate capability, of energy analyzing spectrometers is usually set by the time it takes for the energy analyzer to process a pulse. During this time the system is "dead" and cannot accept other pulses. Common Wilkinson-type MCAs, particularly the low cost variety available as personal computer cards, can be quite slow, usually limiting count rates to less than 50,000 per second. Faster MCAs of comparable accuracy are available, but are much more expensive. Because a factor of 10 increase is desired for synchrotron applications, MCAs are not usually employed and the cheaper and faster windowing SCAs are used instead.

To inspect for pileup, the spectrometer must be able to detect the arrival times of the pulses coming from the preamplifier and then reject those that are closer together than the spectrometer's shaping time. If this is not done, such pulses are summed by the processing circuitry ("piling up"), and produce spectral distortions in the output. Because pileup occurs as the square of the input pulse rate, pileup inspection is a necessity when operating at the high count rates encountered in synchrotron experiments. Common commercial spectroscopy amplifiers are primarily designed for nuclear applications, however, and do not function effectively with x-rays below 10 keV. Typical inspection intervals are 500 to 600 ns, meaning that pulses arriving closer together than this cannot be distinguished. For the very high data rates encountered in synchrotron applications, a shorter inspection interval of 200 ns or less would be a distinct benefit.

To be properly carried out, a significant fraction of important synchrotron experiments also require energy analysis. These are typically experiments done using softer x-rays, in the region of 2000–4000 eV, where the energy resolution of even the best spectrometers is not adequate to fully resolve the signal energy of interest from the background energies. In these cases a simple SCA window cannot be set to accept only signal counts. Instead a full energy analysis is required and peak fitting is used to extract the signal peak from any nearby background peaks.

Spectrometer tuning is an important issue because each channel requires individual adjustment each time a new range of x-ray energies is to be studied. In conventional instruments this involves, for each channel, setting the amplifier's shaping time, coarse gain and fine gain and then adjusting the SCA's window to only accept counts in the energy range of interest. Accomplishing this requires disconnecting the amplifier and SCA from each other and using a separate calibration system (usually an oscilloscope, gated amplifier and MCA) to make the window setting. Then the amplifier and SCA are reconnected. The procedure is laborious, time consuming, and difficult to accomplish without errors, particularly when large numbers of channels are involved.

Spectrometer bulk also becomes an issue when many detector channels are required. The conventional electronics required for a 13 element detector array alone completely fill an electronics rack. Thus considerably higher density is required if 100 element arrays are to be practically implemented.

For these synchrotron applications, and many others as well, it would thus be advantageous to have a low cost, small volume spectrometry device capable of providing full energy analysis with good energy resolution at high count rates and be further capable of being interfaced to a computer system so that necessary tuning operations could be accomplished automatically by an appropriate program.

SUMMARY OF THE INVENTION

The present invention provides high speed digital signal processing as part of a physically compact, low cost, high speed method and apparatus for processing the pulse signals from a detector-preamplifier system and providing a complete energy analysis of the radiation impinging on the detector. In specific embodiments, it performs pileup inspection, has a digital interface so that it can be easily connected to a computer, and can operate effectively with either continuous reset or periodic reset preamplifiers.

The invention is designed to employ digital signal processing techniques to analyze the detector-preamplifier input pulses. In this way, the high sample rate, low cost analog-to-digital converters (ADCs) and low cost, high speed digital signal processors (DSPs) which are now available commercially for applications in the telecommunications industry can be used to meet the desired performance criteria. Appropriately integrated into a digital spectrometer, the invention is capable of duplicating the energy resolution and exceeding the pileup rejection performance of state of the art analog x-ray spectrometers and producing complete output spectra while operating at very high count rates which exceed those previously typical even of SCA systems. The use of low cost, high density digital circuitry allows reduction in overall costs by a factor of about 4 and physical volume by a factor of over 10, compared to commercial analog circuitry. The invention allows all spectrometry tuning functions to be implemented digitally so that they may be handled automatically by an appropriate external computer program.

The general design principle of the digital spectrometer in which the invention operates, which is described in the above referenced application of Warburton et al. entitled "METHOD AND APPARATUS FOR DIGITALLY BASED HIGH SPEED X-RAY SPECTROMETER" (Attorney Docket 17032-1-2) is that, for its intended application, obtaining high data throughput rates at low cost is more important than obtaining optimum energy resolution. This is achieved by carrying out the required digital pulse processing in two stages. The first stage, which includes an embodiment of the present invention, uses "hardwired" digital combinatorial logic to implement time invariant filtering, while the second stage uses a programmable processor which makes adjustments and corrections to the first stage's output, based on time dependent parameters. It is precisely this division of labor that allows the referenced invention spectrometer to achieve its dual goals of high performance and low cost.

Broadly, a digital combinatorial logic circuit according to an embodiment of the invention includes a digital shaping filter that receives the digitized input signal (or possibly a decimated version thereof) and provides a filtered signal whose amplitude at a given time represents an estimate of the amplitude of a given step-like pulse in the original input signal. A pulse detector also receives the digitized input signal and provides an output signal representing the detection of a pulse in the digitized input signal. The pulse detector output signal is used to initiate the capture (for example, in an output buffer) of a value of the filtered signal. The capture is timed to occur after a predetermined time delay that depends on at least one characteristic of the digital shaping filter so that the estimate that is captured corresponds to the detected pulse. The capture of the estimate may be inhibited if there are circumstances (such as pileup) that would prevent the captured value of the filtered signal from representing a valid estimate of the pulse amplitude.

In the specific embodiment, the combinatorial logic stage does not employ adaptive triangular filtering, symmetric or asymmetric cusp-like weighting, or any of the moving deconvolution schemes which are typical of the art to date. Such schemes require complex data operations including: multiplication; lookup tables for weighting functions; data set buffering for both time variant processing and interprocess synchronization; and the like. Instead, we have implemented only the simplest trapezoidal filtering in both a slow and a fast channel, using an algorithm which requires only addition and subtraction. As commonly practiced in the art, the output of the fast channel is used for pileup inspection and slow peak capture, while the slow channel filtering provides the noise reduction required to achieve good energy resolution. See, for example, the analog spectrometer design of Goulding and Landis, (U.S. Pat. No. 4,658,216). Processing all pulses identically and eliminating all complex data operations so simplifies the invention first stage design that it can be readily implemented in, for example, a single medium sized field programmable gate array (FPGA) and still process over 500,000 counts/second (CPS). For comparison, a similar sized device was required simply to implement the state machine required to control data flow in the digital spectrometer shown by Mott et al. (U.S. Pat. No. 5,349,193).

In the invention, the hardwired digital processing stage is designated as the FiPPI because it implements filtering, peak detection, and pileup inspection. The FiPPI processes every data sample, but performs only the small set of filtering and inspection functions which are required to detect and accurately capture the amplitude of x-ray pulses in the input data stream. The DSP computations required to process the FiPPI outputs to produce accurate x-ray energy values are more complex, but need to occur only as often as actual events are detected. As noted above, this division is beneficial because it minimizes both the amount of expensive fast logic required and the speed (and hence cost) of the DSP required. The result is lower cost and higher performance than if either approach were used singly. The specific implementation is capable of handling input count rates in excess of 500,000 cps while implementing full pileup inspection and multichannel analysis. It throughput has been found to be twice that of conventional analog systems with single channel analyzers and up to 10 times that of MCA systems.

Used alone, however, the FiPPI does not produce competitive spectroscopic performance, compared to existing analog devices. Instead, as described in the above referenced digital spectrometer patent application, it achieves its best energy resolution when used in conjunction with a DSP which makes corrections based on various operating parameters. Because the filtering operations carried out in the FiPPI are both simple and stable, these corrections are readily computed and applied, which reduces the DSP's performance requirements.

The FiPPI functions which occur in one or another specific implementations comprise a decimator, a slow shaping (preferably trapezoidal) filter, a fast shaping (preferably trapezoidal) filter, a peak detector, a pileup checker, an output buffer, and an input count rate (ICR) counter. The FiPPI operation is controlled by several adjustable digital parameters which are loaded into the FiPPI before the spectrometer system commences operation.

The decimate by N function breaks up the input from the ADC into successive blocks of N values and outputs the average value of each block at 1/N th the frequency of the input data stream. The adjustable parameter N is a power of 2, taking the values 1, 2, 4, 8, etc. The primary function of the decimator is to reduce the amount of First-In-First-Out (FIFO) memory required to implement long filtering times in the FiPPI's slow filter.

Both the slow and fast filters produce the digital equivalent of analog filtering by a symmetrical trapezoid function. The value of the slow filter output trapezoid in the middle of its flattop region constitutes a measurement of the energy of the corresponding detected x-ray. The trapezoids' peaking times (the times required to rise from zero to their flattop values) and flattop lengths are externally loaded parameters, with falltimes equaling risetimes. The filters produce these outputs by forming the running average of the difference of two delayed offset differences. The offset difference delays are implemented using FIFO functions. The fast filter is much shorter than the slow filter and normally runs at full clock speed. The slow filter works with the decimator output at 1/N clock speed and can easily produce filter times of several microseconds or more using FIFOs which are only 32 words deep.

The output of the fast filter is inspected for signal pulses by a peak detection circuit which looks for M or more consecutive values above some threshold level T and, finding such a set of values, captures the arrival time of the maximum signal value within the set. This arrival time of maximum signal is thereafter defined as the arrival time of the associated signal pulse. The externally loaded parameters T and M may be adjusted to optimize sensitivity to low signal levels while maintaining adequate immunity to triggering by noise.

The function of the pileup inspector is to assure that the slow filter trapezoids are sampled in the middle of their flattops and that this sampling occurs only when this value results from a "good event." A good event is one which results from a pulse which is separated from both its predecessor and successor by acceptable time intervals, which must at least be greater than the slow filter's peaking time. That is, a good pulse must be free of both leading edge pileup and trailing edge pileup.

Pileup inspection is implemented using two or more tests. The first "slow" test counts the time between successive outputs of the fast channel peak detector and rejects pulses which are closer together than an external parameter which is set to exceed the slow filter peaking time.

The other two tests are for "fast pileup" pulses, which are pulses that are so close together that they do not resolve as separate fast filter output peaks. The first fast pileup test uses the fact that, for a fully isolated pulse, the duration D of a digital trapezoidal filter's output is independent of the input pulse's amplitude. A pair of closely piled-up pulses separated by time d, however, extends the duration of the fast filter output to D+d. Counting the time a fast filter peak spends above the threshold T and comparing to a parameter W thus allows detection of the close pileup condition. The parameter W is therefore adjusted to be a value slightly longer than the maximum expected for a single pulse event.

Whereas the first fast pileup test compares the fast peak's width at threshold to a test value, the second fast pileup test compares its width at half amplitude to a test value set to be slightly greater than the half width of an ideal fast pulse. This test is pulse amplitude independent, and, while more complex to implement, has increased accuracy for very low amplitude fast pulses which may not exceed the threshold by very much and whose durations above a fixed amplitude threshold are therefore strongly amplitude dependent. It operates by implementing a comparison similar to that used in the threshold width comparison test above, except that a delayed copy of the fast pulse is tested by counting its time above an adjustable threshold H, where H is one half of the fast pulse's amplitude, as captured by the fast peak detection circuit.

The pileup inspector captures good event flattop amplitudes from the slow filter output by starting a counter when a fast peak is detected. If this counter reaches the value S without another fast peak being detected, the output buffer captures the slow filter's output value at that instant. Then, if the time interval preceding the peak was also long enough, so that it qualifies as a good event, a DSP interrupt flag is raised to signal that a good event has been captured. The unfiltered value of the FiPPI input is also captured at this instant. The externally loaded parameter S is essentially the trapezoidal risetime plus one half of the flattop, adjusted for timing offsets. After a good event value is captured, a second attempt is made to count to S. If this is successful, it means that the slow filter output has returned to its baseline level, allowing a value to be captured on DSP request for use in normalization corrections.

The ICR counter is incremented whenever an x-ray is detected, whether it is piled up or not. This value is read and zeroed each time a good value is read so that statistics on the fractional pileup rate can be collected. Its major function, however, is to provide an accurate estimate of the true data rate being processed so that accurate deadtime corrections can be made when quantitatively precise results are required.

In all FiPPI functions, any control parameters are externally supplied as digital values in addressable registers. This feature makes the design easy to interface to a control computer in order to achieve automated access to all spectrometry functions.

The FiPPI is designed to allow the DSP to retrieve data under interrupt control, as noted above. The interrupt is raised by the FiPPI to signal that it has captured a good event value. The DSP then reads FiPPI output registers containing the good event value, the value stored in the ICR counter, the unfiltered value of the FiPPI input, and any other values characterizing the captured event. If the DSP's interrupt response is designed to be less than the FiPPI's minimum slow filter peaking time, this read will not add any paralyzable dead time to the overall system response.

The FiPPI is also designed to capture baseline values for the DSP on request. In this mode, if, after collecting a good event value, the FiPPI can count to S again, it captures the slow filter output value a second time as a baseline value, sets a baseline flag, and again interrupts the DSP. This value is read into the DSP the same way as good event values are.

The set baseline flag allows the DSP to distinguish the two cases. Since baseline values are captured when no pulses are present they correspond by definition to events with zero energy. They can thus be used to independently establish the zero energy point in the spectrum. Statistics can also be collected on the baseline values and used for diagnostic purposes such as monitoring the energy resolution of the complete spectrometer.

A further understanding of the nature and advantages of the present invention may be realized by reference to the remaining portions of the specification and the drawings.

BRIEF DESCRIPTION OF THE DRAWINGS

FIG. 2 is a block diagram of the invention showing its major parts and its connections to other equipment;

FIG. 3 is a block diagram of the Analog Signal Conditioning (ASC) and A to D hardware blocks of FIG. 2;

FIGS. 8A–8G are a series of timing diagrams demonstrating the relationship between corresponding pulses output by the Fast and Slow Filters of FIG. 4 and illustrating functions of the Peak Detector and Pileup Checker blocks of FIG. 4;

FIG. 10A is a circuit schematic of a representative embodiment of the Pileup Checker hardware block of FIG. 4;

DESCRIPTION OF SPECIFIC EMBODIMENTS

1: Input Signals

1.1. Preamplifier

Figure 1C:
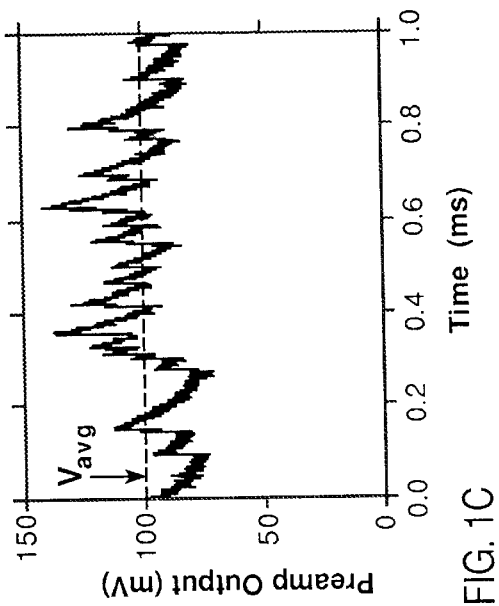
FIG. 1C demonstrates typical outputs from a continuous discharge detector-preamplifier over the course of multiple x-rays.
Figure 1E:
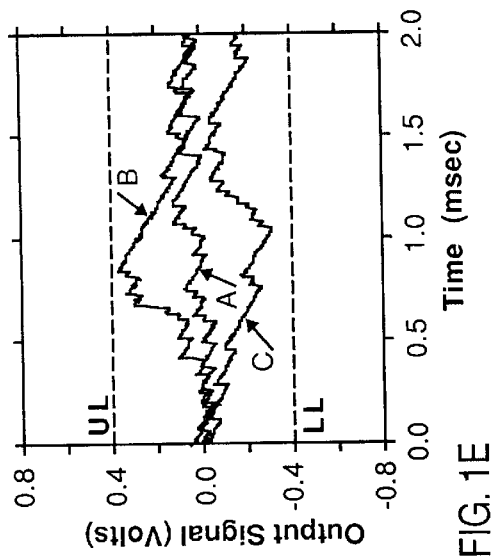
FIG. 1E shows three common x-ray pulse arrival patterns after the ASC has removed the reset-ramp portion of the signal.
Figure 1B:
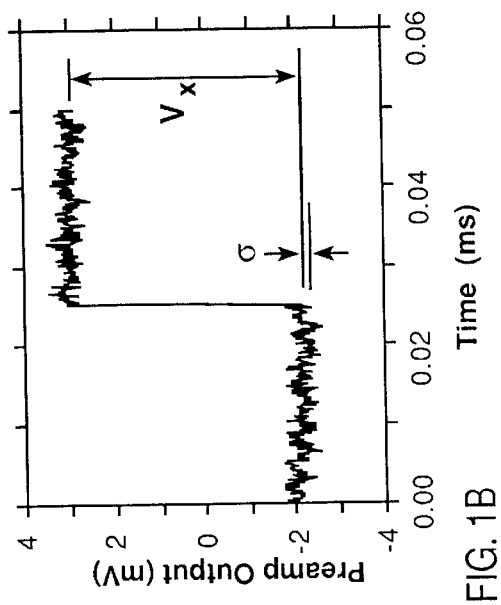
FIG. 1B is the trace of a typical output signal from the detector-preamplifier resulting from the absorption of a single x-ray in the detector.

The description of specific embodiments will be clarified by a brief discussion of the electrical pulses, each corresponding to a detected x-ray, which we intend to process. Such pulses, in the common case of a semiconductor x-ray detector, are generated by a circuit similar to that shown in FIG. 1A. This circuit comprises a semiconductor detector diode 10 reverse biased by a voltage supply 12 and connected to charge integrating preamplifier 13 with a feedback capacitor $C_f$ 15 and a feedback element 17. When diode 10 absorbs an x-ray of energy $E_x$, a charge $Q_x$ equal to $E_x/\epsilon$ is released, where the constant $\epsilon$ is characteristic of the diode semiconductor material. $Q_x$ is integrated on $C_f$ 15 and produces an output voltage step $V_x$ equal to $Q_x/C_f$—such as is shown in FIG. 1B. Obtaining an accurate estimate of $E_x$ therefore requires accurately measuring the voltage step $V_x$ in the presence of the preamplifier's output noise voltage, whose rms value is indicated in FIG. 1B by the value σ. In the present invention, digital filtering is used to reduce the amplitude of this noise and produce a more accurate estimate of $V_x$.

Functionally speaking, there are two basic types of energy sensitive preamplifiers. Because preamplifier 13 cannot integrate charge indefinitely without exceeding its linear operating range, the feedback element 17 is provided to discharge capacitor 15. In the first basic type, feedback element 17 continuously discharges capacitor 15 (the "CD" case), which is implemented in practice either by using a resistor for feedback element 17 (the classic case) or by other schemes such as forward biasing the JFET input transistor in preamplifier 13. A typical preamplifier output in the CD case is shown in FIG. 1C, and appears as a series of nearly vertical steps, each corresponding to a step such as shown in FIG. 1B, followed by an exponential decay as feedback element 17 bleeds charge off of capacitor 15. The average output voltage level, $V_{avg}$, results in a discharge current flow through feedback element 17 just equal to $I_{in}$, the input current flow from diode 10. This input current flow includes both leakage current and the current generated by the x-rays absorbed in diode 10. The maximum count rate the preamplifier can handle is set by the maximum value $V_{max}$ to which $V_{avg}$ can rise without fluctuations in the signal exceeding the preamplifier's linear operating range.

Figure 1D:
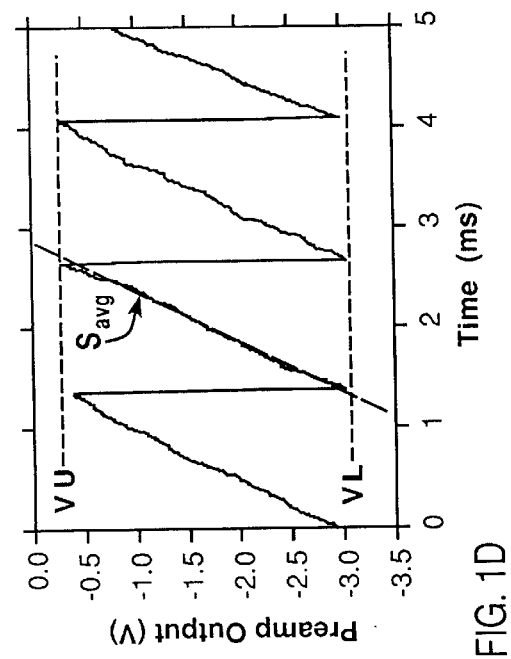
FIG. 1D demonstrates typical outputs from a periodic reset detector-preamplifier over the course of multiple x-rays.

In the second basic energy sensitive preamplifier type, feedback element 17 only discharges capacitor 15 at those moments when the output voltage of preamplifier 13 approaches the upper reset value VU which is slightly less than $V_{max}$. Feedback element 17 is essentially a switch, which remains closed until the voltage falls to a preset lower limit VL, when it opens again. This is the periodic reset ("PR") case and may be implemented either with a real transistor switch or by applying a pulse of light to the gate region of preamplifier 13's input JFET. This latter technique is known as pulsed optical feedback ("POF"). FIG. 1D shows a typical output for this case, which consists of a ramp of voltage steps from x-ray pulses which rise to VU, where reset occurs, causing the voltage to return to value VL, whence the process begins anew. Each voltage step has a shape similar to that shown in FIG. 1B and the resultant ramps have an average slope $S_{avg}$ equal to $I_{in}/C_f$. Typical fluctuations of the signal about the ramp are shown in FIG. 1E, where the individual x-ray arrivals are seen as small vertical steps.

1.2. ADC Output

Selecting the ADC is possibly the single most important issue in implementing a digitally based x-ray spectrometer when both very good energy resolution and good pileup rejection at very high counting rates are required. Pileup rejection issues set the digitization requirement. If a digital system is to achieve the 200 ns pulse inspection times of modern analog x-ray spectrometers, it must sample at several times this rate to resolve pulses which are this closely spaced in time. As an estimate, 50 ns per sample or 20 megasamples/second (MSA) is required. Higher sampling rates could further improve the spectrometer's performance.

The number of ADC bits depends upon the interplay between cost, speed, and resolution of dynamic range, as described in the above referenced patent application of Warburton et al. entitled "METHOD AND APPARATUS FOR ANALOG SIGNAL CONDITIONER FOR HIGH SPEED, DIGITAL X-RAY SPECTROMETER" (Attorney Docket 17032-1-1). In our preferred digital spectrometer embodiment a 20 MSA, 10 bit ADC is employed, and so the preferred embodiment invention FiPPI presented here will therefore be for a 10 bit input. Adapting the design to other numbers of input bits will be readily understood by those skilled in digital electronics.

2. System Overview

Figure 1A:
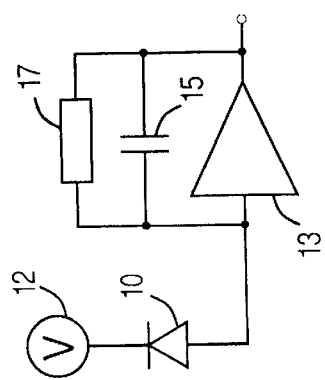
FIG. 1A is a circuit schematic of a representative detector-preamplifier system of the type which supplies pulses to the present invention.

FIG. 2 shows the basic structure of a digital spectrometer implementation in which the present invention is employed. Input is from a conventional detector-preamplifier 20, such as is represented in FIG. 1A and described above. It feeds into a digital spectrometer 22 comprised of four primary functional blocks: an analog signal conditioning (ASC) block 23; an analog-to-digital converter (ADC) and control digital-to-analog (DAC) block 24; and a digital processing section comprising two major functional blocks: the invention hardwired digital filter, peak detector, and pileup Inspector (FiPPI) block 25; and a programmable digital computer block 27, which in a specific embodiment is an embedded digital signal processor (DSP), for signal refinement, multichannel signal analysis, ASC control and input/output (I/O) functions. The digital spectrometer 22 connects to a general purpose control computer and interface 28, from which it receives parameter values to control its operation and to which it sends collected spectra. The function of ASC 23 is not required for the operation of the digital spectrometer blocks 25 and 27, but in our preferred embodiment is implemented according to the teachings of the above-referenced application of Warburton et al. entitled "METHOD AND APPARATUS FOR ANALOG SIGNAL CONDITIONER FOR HIGH SPEED, DIGITAL X-RAY SPECTROMETER" (Attorney Docket 17032-1-1). The functions of blocks 25 and 27 can be implemented using various circuitry, but in our preferred embodiment are implemented according to the specification presented below. The general purpose control computer and interface 28 are conventional and may include any of a variety of common personal or laboratory computers and interface standards. The details of interfacing a computer to a DSP are well known to those skilled in the art of digital electronics.

The relations between the functional blocks of the digital spectrometer 22 are also indicated in FIG. 2. The spectrometer receives its input from detector-preamplifier module 20 and delivers complete x-ray spectra to general purpose control computer 28. The flow of signals and control within the spectrometer are indicated by the heavy lines connecting the functional blocks. Thus the ASC 23 accepts an analog signal from block 20 and conditions it for analog-to-digital conversion in ADC block 24, which outputs a digital replica of the same signal to the FiPPI 25. Values of this digital signal can also be captured directly by the DSP 27. The DSP 27 sets parameter values for both the ASC 23 and FiPPI 25, to control their operation, the former being first converted into analog signals by ADC block 24. The DSP 27 receives filtered amplitude values captured by the FiPPI 25 and uses them to compute x-ray energy values, which it bins to produce a multichannel spectral analysis (MCA) of the incident x-ray energies. When data collection is complete, DSP 27 sends its collected spectrum to control computer 28. Prior to the start of data collection, such required control parameters as gain, filter shaping times, pileup inspection levels, etc., are downloaded to the DSP 27 from the control computer 28.

The function of the ASC block 23 it to reduce the dynamic range of the preamplifier's signal so that it can be digitized using a smaller number of bits in the ADC. This is described in above-referenced application of Warburton et al. entitled "METHOD AND APPARATUS FOR ANALOG SIGNAL CONDITIONER FOR HIGH SPEED, DIGITAL X-RAY SPECTROMETER" (Attorney Docket 17032-1-1). In the present case only a brief description will be given so that the function of the invention spectrometer can be understood in proper context.

FIG. 3 is a functional block diagram of ASC block 23 and ADC and control DAC block 24. An amplifier 30 accepts an input signal from the detector-preamplifier 20 and amplifies the difference between it and the voltage level set by a digital-to-analog converter (DAC) Bias DAC 32. This allows the preamplifier signal to be centered about zero in the rest of the circuit, allowing maximum gains relative to the fixed amount of amplifier noise. A subtractor 33 subtracts the output of a LFF generator 35 from amplifier 30's output. LFF generator 35's output waveform is controlled by inputs from an Offset DAC 37, a Slope DAC 38, and a reset line 40 directly from the DSP 27. Subtractor 33's output feeds a variable gain amplifier 42, whose gain is controlled a Gain DAC 43. A comparator 44 examines the signal and alerts the DSP 27 on interrupt line 45 if it passes outside the ADC's input limits. A low pass filter 47 removes any signal frequencies above the ADC's Nyquist limit before it reaches an ADC 48.

The ADC output connects both directly to FiPPI block 25 via a digital ADC output bus 50, and indirectly to DSP block 27 via a set of bus buffers 52. The buffers 52 attach to the bidirectional DSP data bus 53, the DSP address lines 54, and the reset line 40. By appropriately loading values onto DSP address lines 54 and writing or reading DSP data bus 53, DSP 27 can load digital input values to the DACs 32, 37, 38, and 43. and sample the ADC output data stream on ADC output bus 50 as desired. Thus it both directly controls all the ASC 23's functions and can also directly measure the effect its actions on the ADC output 50.

Under control of the DSP 27, the ASC's LFF generator 35 generates a waveform, consisting a DC offset combined with resetting ramp function, which is then subtracted from the input signal. For a CR preamplifier only a DC offset of value $V_{avg}$ is used (see FIG. 1C). For a PR preamplifier, the DC offset is set to the value VL and the ramp's slope is adjusted to match the average slope $S_{avg}$ (see FIG. 1D). Three samples of the resulting signal, after gain adjustment and Nyquist filtering, are indicated in FIG. 1E (for a PR preamplifier case). The quasi-periodic ramp structure has been removed and the individual x-ray pulses can be seen as vertical steps with fluctuations between their individual arrival times. Trace A shows the average rate of arrival case. Trace B shows a fluctuation in which the count rate temporarily increases and then decreases to return to the average rate. Trace C shows an opposite case of low rate fluctuation followed by a return to average. Further discussion of these fluctuations and the details of setting the ASC gain to accommodate them may be found in the above-referenced application of Warburton et al. entitled "METHOD AND APPARATUS FOR ANALOG SIGNAL CONDITIONER FOR HIGH SPEED, DIGITAL X-RAY SPECTROMETER" (Attorney Docket 17032-1-1). The regions between the steps, which were approximately horizontal at the output of the preamplifier (i.e., as shown in FIG. 1B), are now negatively sloped by the average slope value which was subtracted. The amplitudes of the steps themselves (i.e., $V_x$ in FIG. 1B) are not appreciably modified by this procedure and are to be recovered by the digital spectrometer.

For CR preamplifiers, the ASC output would look much like FIG. 1C, except that the vertical scale would be adjusted to fill the ADC's entire input range. In this case the regions between the x-ray pulses are not linear, but have the same exponentially decaying slopes as the preamplifier, since the latter is DC coupled to the ASC.

When the FiPPI operates on these waveforms, its output depends not only on the heights of the encountered steps, but also on the functional shapes it finds between them, which will in turn depend upon the specific slope and offset values the ASC is using at any given instant. Since it will be important to understanding the DSP's spectroscopic correction routines later in the specification, we emphasize that, because both the offset and slope subtracted by the ASC are set by the DSP 27 via DACs 37 and 38, the DSP has full knowledge of these parameters and can use them as required to correct the FiPPI's output to recover undistorted step height amplitudes.

3. FiPPI: Filter, Peak Detection, and Pileup Inspection Circuit

The FiPPI 25 is implemented in the specific embodiment using combinatorial logic implemented in either a hardwired or re-programmable logic (e.g., FPGA). It is clocked at the same rate as ADC 48, and, accepting digitized signal data on ADC output bus 50, digitally performs the filtering, peak detection, amplitude capture, and pileup inspection functions which are central to the operation of a modern x-ray spectrometer.

3.1. FiPPI Design Philosophy

Achieving a very high count rate capability at a very low cost while processing ADC data at 20 MSA rates is a considerable challenge. Using a hardwired logic processor is advantageous to attaining this major invention design goal.

One common prior art approach in digital spectrometry systems does not attempt to process all the incoming data, but instead buffers it, detects the location of pulses, and only processes data in the vicinity of these detected pulses. This "buffer and process" approach allows interpulse specific processing to achieve optimum signal to noise for each pulse, but has been successfully implemented only for data rates below about 30,000 count/sec. It is also expensive, primarily because the complex data operations can be implemented only through the use of expensive, high speed processing components. Additional complex circuitry is required to synchronize the location and processing of the buffered data.

A second prior art approach deconvolves the preamplifier signal, performing mathematical operations that typically recover the amplitude and arrival time of the charge injected into the preamplifier. At the very high rates contemplated here, this approach fails because it becomes impractical to perform the required processing even with the highest speed processing components practically available. These parts are also expensive and do not meet our criterion for low cost. Moreover, the deconvolution algorithm is preamplifier specific, so that a single set of logic cannot work with a variety of preamplifiers.

In the present invention we have implemented a processing scheme which uses hardwired combinatorial logic unit which completely processes received data at the rate of one point per clock cycle. The multiple operations required by each data point are pipelined. This means that, if we denote by $O(n,j)$ the jth operation required by data sample n, then at time step i, we will simultaneously execute operations $O(n,1)$, $O(n-1,2)$, $O(n-2,3)$, etc. Since all these operations are performed in parallel, once per clock, as many operations as necessary can be implemented without having to pay any speed penalty.

Processing signals using pipelined digital combinatorial logic in this manner has significant limitations imposed by our speed and cost criteria, however. First, if each pulse receives identical (time invariant) filtering treatment to restrict the logic's complexity and cost, compensatory adjustments cannot be made based on pulse-specific conditions. Secondly, while hardwired addition and subtraction are readily implemented to function at high clock speeds, multiplication and division are considerably slower and require many more logic functions to implement. Since the slowest implemented operation sets the maximum clock rate, allowing multiplication and division either restricts the maximum data rate or requires much more costly high speed components. This produces a dilemma, since the limited pulse processing achievable using logic. operations no more complex than addition or subtraction is not accurate enough to meet our spectroscopic performance goals.

The present invention resolves this dilemma by employing a hybrid strategy that divides the digital signal processing functions into two steps. In the first step, simple high speed pipelined operations are implemented, using combinatorial logic, which preprocess the data stream from the ADC. These operations identify the incoming x-ray pulses and extract initial estimates of their amplitudes. In the second step, these amplitude estimates are passed to a programmable microprocessor (or digital signal processor) which then makes such corrections (based upon preamp type, local operating conditions, etc.) as are required to achieve the desired spectroscopic accuracy.

This division of processing is advantageous for several reasons. First, the simplified pipelined preprocessing can be made both very cheap and very fast. For example, in a specific embodiment, it can be implemented in a single FPGA and still accommodate an ADC running at 20 MSA. Second, while the functions in the second step are typically more complex, they need only be executed at the average rate at which x-ray signal events actually arrive, which is typically at least an order of magnitude slower than the ADC sampling rate. In a specific embodiment, for example, the sampling rate is 20 MSA, while the maximum design data rate is 500,000 cps, a factor of 40 less. Third, as will become clear further on, the required corrections can be written in the form of simple formulae, which need only to be applied to the single peak values. Thus, in practice, making corrections after peak capture is both simpler and faster than making them on the data stream itself (through preconditioning or deconvolution) as practiced in existing art.

In this embodiment, the first processing step is carried out in the FiPPI 25, while the second step is carried out in digital signal processor DSP 27, operating under software control. The FiPPI performs the following high speed primary processing steps: trapezoidal filtering to improve signal to noise, x-ray pulse detection, pileup inspection, and filter peak capture. The DSP accepts valid peak values from the FiPPI and performs the more complex calculations needed to produce accurate energy values and bin them appropriately. For the intended maximum average x-ray arrival rate of 500,000 cps in the specific embodiment, the DSP 27 needs only 20 MIPS capability, which is readily available commercially in inexpensive single chip designs.

In line with our proscription against complex logic operations, the specific embodiment implements only trapezoidal filtering (which includes triangular filtering as a subset), which avoids multiplicative data point weighting and transforms filtering into a first category type function which can be incorporated into the FiPPI design. This choice does not, in fact, degrade the spectrometer's energy resolution in the high count rate regime contemplated because, as Gatti and Manfredi showed in their paper entitled "Processing the Signals from Solid State Detectors in Elementary-Particle Physics" published in Revista del Nuovo Cimento, Vol. 9(1) (1986), pp. 1–146, triangular filtering is actually the ideal fixed shaping form in the short shaping time regime where series white noise dominates. Even at longer shaping times the triangular shape is still very effective. Radeka showed in his paper entitled "Low Noise Techniques in Detectors", published in Annual Reviews of Nuclear Particle Science 38 (1988), pp. 217–277, that even at the point of maximum energy resolution (i.e., for the shaping time where the series and parallel white noise terms are equal) a triangular filter's resolution is only 8% worse than that of the ideal cusp filter of infinite extent.

Our approach can thus be summarized as follows. The processing required by every digital sample at the ADC's output data rate is implemented in combinatorial logic in the FiPPI, which uses pipelined processing to inexpensively implement its tasks. The more complex computations required to convert peak amplitudes into accurate x-ray energy values, which need only be carried out at the much slower average x-ray counting rate, are handled by a dedicated DSP. Partitioning the signal processing functions in this manner allows the resultant circuit to be both simpler and less expensive than if all required computations were carried out using only hardwired logic or only a dedicated processor.

3.2. Specific Embodiment of the FiPPI, High Level View

In one specific embodiment, the FiPPI logic is implemented using a field programmable gate array (FPGA) for several reasons. First, this allows a fairly high density of logic to be implemented in a small space. Secondly, and even more important, the logic in FPGAs is not permanent, but is downloaded from a file prior to the start of operation. Thus, changing the operations performed by the logic can be done simply by changing the download file. This allows the logic to be readily modified, either to meet different operating conditions or to incorporate improvements in design, without having to make any physical circuit changes. In other embodiments, where either lower cost per unit or even higher operating speeds are desired, the FiPPI logic in the FPGA can be replaced by an application specific integrated circuit (ASIC) or other logic circuitry. We have designed the FiPPI's pinout and associated pad layout in the specific embodiment so that either an FPGA or ASIC implementation can be employed in the digital spectrometer with no other hardware changes. This allows inexpensive ASIC FiPPI designs to be used for the most common spectrometry applications, yet also allows FPGA FiPPI designs to be tailored to uncommon applications and be substituted into the circuit with without having to incur any additional board redesign costs. This design can thus satisfy demand at a variety of production scales at a minimum of added cost.

Figure 4:
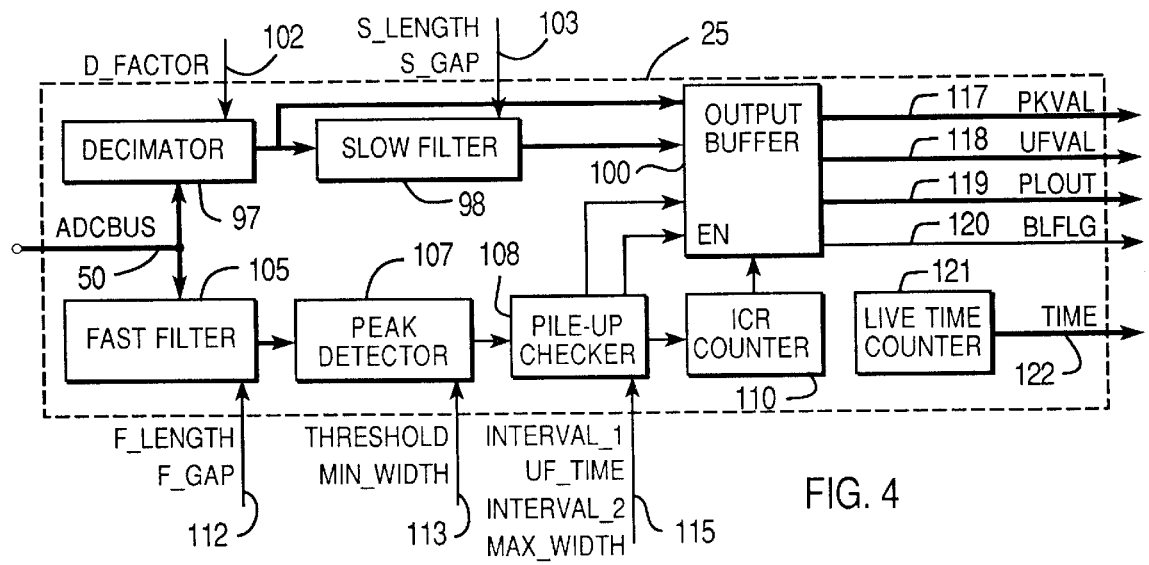
FIG. 4 is a block diagram of the Hardwired Digital Signal Processor hardware block of FIG. 2.

The overall topology of the FiPPI 25 in a specific implementation is indicated in FIG. 4. The digitized pulse stream enters the FiPPI on ADC output bus 50 and feeds into both a slow and a fast signal channel. The first slow channel circuit is a decimator 97, which reduces the incoming signal's data rate by a preset factor. The decimated signal is then processed by a slow filter 98 which digitally implements trapezoidal filtering. The peak maxima in the signal output by the slow filter 98, which correspond to the energies of the detected x-rays, can be captured by an output buffer 100. The operation of the slow channel is controlled by parameters loaded into the FiPPI 25 from the DSP 27. These parameters are a decimation factor 102 and the slow filter's length and gap values 103.

The fast signal channel's principal function is to inspect the data input stream 50 and trigger output buffer 100 to capture appropriate values from the slow filter 98. The fast channel's first circuit is a fast filter 105, which also digitally implements trapezoidal filtering, but with a much shorter time constant than in the slow channel. A peak detector 107 inspects its output for peaks which exceed a preset threshold value for at least a preset number of consecutive samples and then captures the arrival times of these peaks' maxima. These arrival times define the associated x-ray events' arrival times and are used to time the trigger to the output buffer 100. Output pulses from the peak detector are inspected by a pileup checker 108 which rejects events whose maxima would overlap (pile-up) in the slow filter 98. Each time the pileup checker 108 detects a good peak it triggers output buffer 100 to capture the slow filter's 98 output value for export to the DSP 27 for further processing. Each peak detector 107 output pulse also increments an input count rate (ICR) counter 110. As in the slow channel, the fast channel's operation is controlled by parameters loaded from the DSP 27. These parameters are: the fast filter length and gap 112, the peak detector's threshold and minimum peak width test values 113, and the interpeak interval, fast peak maximum width, and timing offset values 115 required by the pileup checker.

Each time the output buffer 100 is triggered it also records two other values: the value in the ICR counter 110 and a flag to denote what type of slow filter value was captured. The buffer therefore outputs four values to the DSP 27: two captured slow filter values PKVAL 117 and UFVAL 118, the number of x-rays PLOUT 119 since the last output, and a flag BLFLG 120 indicating whether PKVAL 117 is an x-ray amplitude value or a baseline value for normalization purposes.

The final FiPPI circuit in the specific implementation is a livetime counter 121, which measures the actual time TIME 122 the digital spectrometer spends collecting data. This is useful for two reasons. First, because spectrometer operation is controlled by DSP 27, it may be difficult to precisely time data collection processes started under software control by control computer 28. Second, each spectrometer in a multiple detector system will experience a different data collection history, including differing numbers of preamplifier resets and other events which temporarily interrupt the counting process. Therefore it is important for each spectrometer to be able to accurately measure its own livetime so that count rates can be accurately determined on an absolute basis for each detector in the system.

An optional FiPPI circuit, which may be preferred in implementations for certain applications, is a Sub-Address Generator module, which is not shown in FIG. 4, but is described and illustrated in §4, below.

Figure 5A:
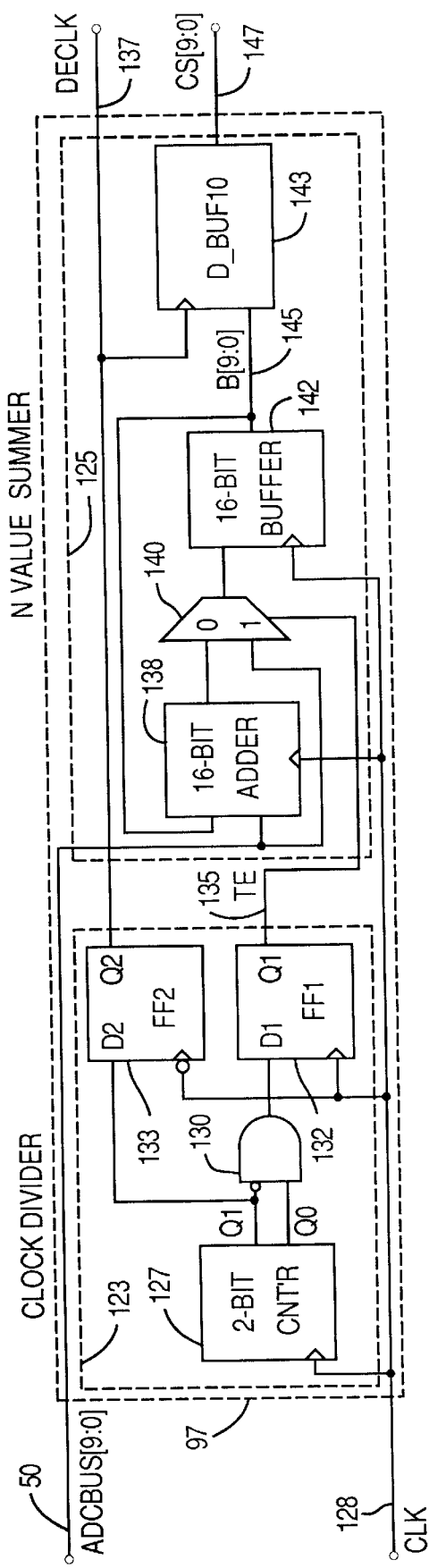
FIG. 5A is a circuit schematic of a representative embodiment of the Decimator hardware block of FIG. 4.

3.3. Operation of the Subcircuits in the FiPPI Specific Embodiment 3.3.1. Decimator FIG. 5A is a circuit schematic of the decimator 97, with representative signals shown in FIG. 5B. In the illustrated specific embodiment, the decimator 97 is hardwired to decimate by a factor of 4 and comprises a clock divider 123 and an N value summer 125. The clock divider comprises a counter 127 connected by a NAND gate 130 to a flipflop FF1 132 and directly to a flipflop FF2 133. Counter 127 is driven by the system clock CLK 128. All inputs to NAND gate 130 are inverted except Q0 so that the load input D1 to FF1 132 is only 1 once every 4 cycles, as is its output signal TE 135. Similarly, flipflop FF2 133 produces a 50% duty cycle output clock DECLK 137 at one fourth CLK 128's frequency. Using similar techniques, those skilled in digital electronics may easily implement circuits which divide CLK 128 by any arbitrary parameter D_Factor 102, as schematically indicated in FIG. 4, although powers of 2 are easiest to achieve. A second approach, which consumes fewer FPGA resources is to create a separate design for each clock decimation factor and download the desired one into the FPGA at data collection time.

Figure 5B:
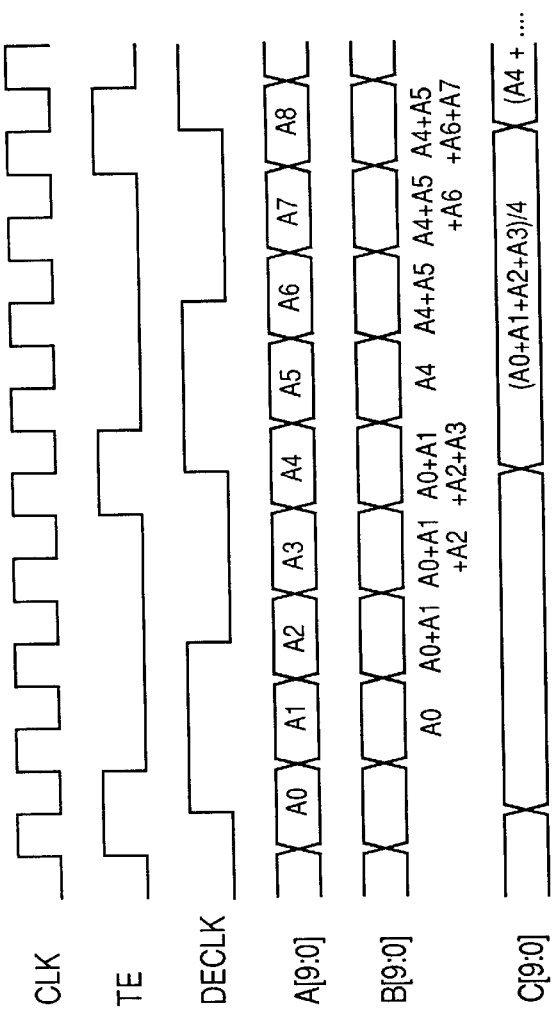
FIG. 5B is a timing diagram illustrating the operation of the circuitry of FIG. 5A.

The operation of the N value summer 125 is independent of how the signals DECLK 137 and TE 135 are generated. The summer comprises a 16 bit adder 138, a two input multiplexer 140, a 16 bit buffer 142, and a 10 bit buffer 143. Signal values for decimation by 4 are shown in FIG. 5B. Once every 4 cycles, on signal TE 135's rising edge, multiplexer 140 loads the input data stream A[9:0] 50 directly into the 16 bit buffer 142. On the next three CLK 128 cycles, multiplexer 140 connects the output of the adder 138, which is the sum of the input A[9:0] 50 and the output of buffer 142, to the input of buffer 142. Every 4 cycles the rising edge of DECLK 137 transfers buffer 142's output B[9,0] 145 to buffer D_BUF10 143, whose output CS[9:0] 147 is then that of the decimator module 97. In the specific embodiment shown, only 10 bits are used in signal B[9:0] 145, but this is only a design convenience. If more bits are required to achieve optimum noise filtering performance, the depth of buffer D_BUF10 143 is easily increased so that more than 10 bits can be transferred to CS[9:0].

3.3.2. Slow Filter Module 3.3.2.1. Theory of Trapezoidal Filtering

Figure 6A:
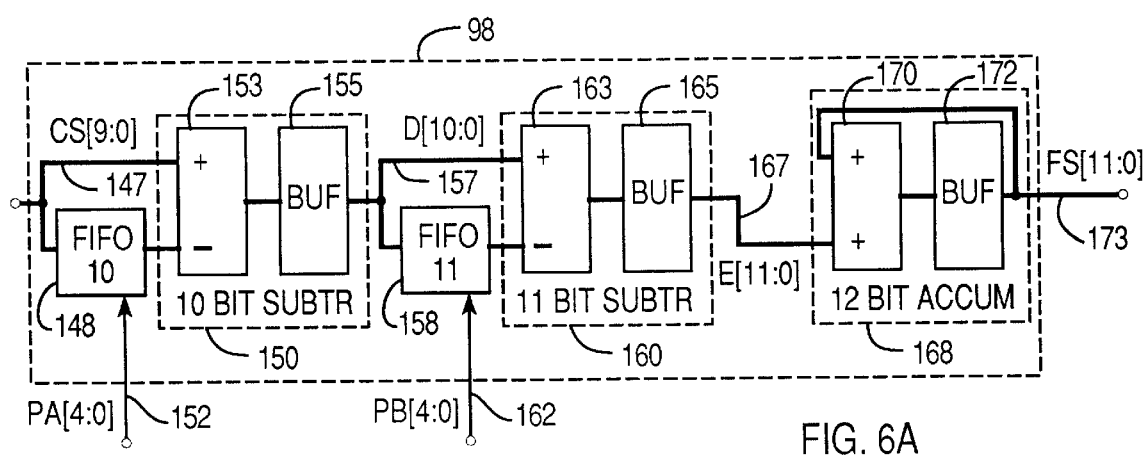
FIG. 6A is a circuit schematic of a representative embodiment of the Slow Filter hardware block of FIG. 4.
Figure 6B:
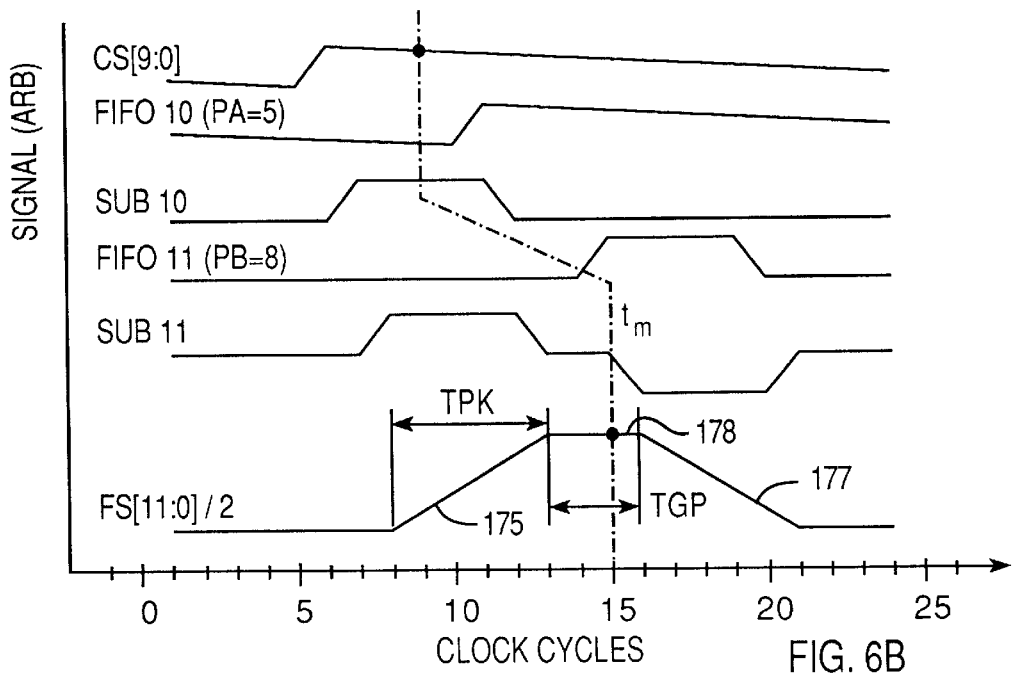
FIG. 6B is a timing diagram illustrating the operation of the circuitry of FIG. 6A.

The implementation of the slow filter module 98 is shown by the block circuit schematics in FIG. 6A and the waveforms in FIG. 6B. In order to describe this module, we first consider trapezoidal filters mathematically.

The trapezoidal filter function values $\{T_i\}$ of a stream of data values $\{d_i\}$ at times $\{i\}$ are given by the equation $$T_i = -\sum_{k=i-2L-G+1}^{i-L-G} d_k + \sum_{k=i-L+1}^{i} d_k \qquad (1)$$

Here L and G are the slow filter interval length $L_s$ and gap interval $G_s$ and enter the module as parameters 103. When the $G_s$ is zero, the trapezoidal filter becomes the more commonly used triangular filter function. Both forms have been extensively discussed in the analog spectrometer literature. The trapezoidal function has the benefit that its amplitude is independent of charge collection time in the detector if the gap $G_s$ is made adequately long, thus avoiding the phenomenon of ballistic deficit. On the other hand, its signal to noise ratio for short shaping times is not as good as that of the triangular function. In the present case the selection is completely under the control of the experimentalist who sets the control parameters S_Length and S_Gap 103. As noted earlier, triangular filtering provides theoretically optimum signal to noise in the limit of white series noise, which is the case encountered when using short shaping times to process pulses at very high data rates. These issues are well understood by those skilled in the field of detector signal processing. The point of primary importance is that, among non-adaptive filters, the triangular shape gives optimum performance at high data rates and it can be obtained from the difference between two sums, as per Eqn. 1.

Eqn. 1, however, is not preferred from an implementation viewpoint because it requires both temporary storage for summing the most recent $2L_s + G_s$ data points and also the implementation of adders with enough bits to handle the resultant sums. For long filter times, such adders not only consume excessive FPGA real estate but they also operate slowly, limiting the FiPPI's achievable speed. Instead, Eqn. 1 can be recast in the recursive form:

$$T_i = T_{i-1} + d_i - d_{i-L} - d_{i-L-G} + d_{i-2L-G} \qquad (2)$$

Further, noting that the partial sum $(d_{i-L-G} + d_{i-2L-G})$ is just the partial sum $(d_i - d_{i-L})$ evaluated $L_s + G_s$ timesteps earlier, we discover that it is possible to create $T_i$ according to Eqn. 2 using only two first-in-first-out (FIFO) memories: one $C_W$-bits wide by $L_s$ bits deep to hold $L_s$ values for making the partial sums $(d_i - d_{i-L})$ and one $C_W + 1$ bits wide by $L_s + G_s$ bits deep to hold enough partial sum values to implement Eqn. 2 (where $C_W$ is the bit width of the decimator output C[9:0] 147 and equals 10 in the specific embodiment).

3.3.2.2. Slow Filter Specific Implementation

FIG. 6A is a circuit schematic of a specific slow filter 98 that creates $T_i$ values according to Eqn. 2 for a 10 bit input. FIG. 6B shows representative waveforms during its operation, at one time step i per clock cycle, with dotted lines showing zero signal levels. The width of all the components in the filter (FIFOs, etc.) would expand by 1 bit for each bit of decimation. Its input CS[9:0] 147, from the decimator 97, is shown in FIG. 6B with a slight slope both before and after a typical pulse to represent the effects of detector leakage current or the operation of the ASC 23. CS[9:0] 147 is applied both to a 10 bit wide FIFO memory 148 and directly to the positive input of a 10-bit subtracter 150, the output of FIFO 148 being applied to its negative input. The depth of FIFO 148 is set by the 5 bit parameter PA[4:0] 152 which corresponds to the filter length Ls in Eqn. 2. Its output is just C[9:0] delayed by PA time steps. The subtracter 150 comprises an asynchronous subtracter 153 and a synchronizing output buffer 155. Its 11 bit (10 bits plus sign) output D[10:0] 157 corresponds to the sequence of partial sums $(d_i - d_{i-L})$ and is fed into an 11 bit FIFO 158 and an 11 bit subtracter 160. The depth of FIFO 158 is set by the 5 bit parameter PB[4:0] 162, which corresponds to $L_s + G_s$ in Eqn. 2 and is obtained from the slow filter input parameters 103. The output of FIFO 158 is just D[10:0] delayed by PB time steps. The subtracter 160 consists of an 11 bit asynchronous subtracter 163 and a synchronizing buffer 165. Its 12 bit (11 bits plus sign) output E[11:0] 167 is a sequence of the partial sum difference $[(d_i-d_{i-L})-(d_{i-L-G}-d_{i-2L-G})]$ in Eqn. 2. The running sum of Eqn. 2. is found by feeding E[11:0] 167 to a 12 bit accumulator 168 consisting of an asynchronous 12 bit adder 170 and a synchronizing buffer 172 with the buffer output fed back to one of the adder inputs. Its 12 bit output F[11:0] 173 is the sequence of values $T_i$ in Eqn. 2.

For a given x-ray absorption event (a step function in C[9:0]) F[11:0] is a trapezoidal pulse whose rising edge 175 and falling edge 177 are both equal to TPK, the "peaking time", which is equal to $L_s$ and controlled by the parameter PA 152. Its flattop 178 has duration TGP, the "gap time," which equals $G_s$ and equals the difference between parameters PA 152 and PB 162. Both PA and PB are downloaded to the FiPPI via the parameters S_Length and S_Gap 103 from the DSP 27 before operation begins and therefore can be set by the experimentalist through the general purpose control computer 28. The black dot on trace FS[11:0] in FIG. 6B shows the time $t_m$ when the pileup checker captures FS[11:0] to output buffer 100 if the peak is not piled-up. When CS[9:0] is also to be captured, this typically happens at a point $(L_s+G_s)/2$ clock cycles after the step in CS[9:0], which is thus $3+L_s/2$ clock cycles earlier than the capture of FS[11:0], accounting for the delays in subtracters 150 and 160 and accumulator 168.

An important feature about the output FS[11:0] 173 is that its baseline is non-zero, the amplitude of the effect being proportional to the slope in the signal CS[9:0] 147. This has two major consequences. First, peak amplitudes are only meaningful if measured with respect to the baseline, which therefore means that the baseline must also be determined accurately for accurate x-ray energies to be extracted. Second, if the slope in CS[9:0] is not constant (as in the output of a CD preamplifier, where the signal slope between x-rays pulses decays exponentially), then the baseline will also vary in time and, in fact, will have to be measured locally for each detected x-ray pulse. The application by Warburton entitled "METHOD AND APPARATUS FOR DIGITALLY BASED HIGH SPEED X-RAY SPECTROMETER FOR DIRECT COUPLED USE WITH CONTINUOUS DISCHARGE PREAMPLIFIERS" (Attorney Docket 17032-1-3), describes techniques to determine the peak amplitude more accurately in the exponential decay case.

The use of 12 bits in accumulator 168 in the specific implementation is just an engineering tradeoff in a spectrometer for XAS applications where only a narrow range of x-ray energies is expected. In principle, the step inputs in signal C[9:0] 147 could be 10 bits so that, with filter lengths of up to 31 (5 bits for $L_s+G_s$), the output FS[11:0] 173 could be up to 16 bits, including sign. To minimize the required number of FiPPI gates, however, we have capitalized on the fact that x-ray pulse heights should be kept to less than 1/16 of the ADC 48 range (i.e., 6 bits) to prevent count rate fluctuations from producing excessive numbers of ASC 23 resets. Hence accumulator 168 requires only 12 bits (11 bits plus sign) in this implementation. In a more general design for a wider range of x-ray energies, an increased number of accumulator bits would be advantageous.

3.3.2.3. Slow Filter Design Issues

Two issues in the design of the slow filter deserve some comment. The first is that its peaking time length, $L_s$, primarily determines its noise reduction properties. In practice, desirable peaking times range from 0.5 μs or less for high speed work to over 20 μs for very high resolution work. With the ADC running at 20 MSA, $L_s$ values therefore run between 10 and 400. If implemented directly, this range would require an 18 bit final accumulator 168. Instead, in the specific embodiment, the maximum value of $L_s$ is restricted to 31, as set by the 5 bit parameters PA 152 and PB 162. Working directly with the ADC output at 20 MSA, this only allows peaking times between 0 and 1.5 μs. However, by working with the output C[9:0] 147 of decimator 97 and by employing decimation factors of up to 16, peaking times of up to 24 μs can be accommodated without requiring longer word lengths in the subtracters and accumulators of the slow filter 98. This approach has two advantages. First, fewer FPGA gates are required, which produces a smaller, cheaper device. Second, since execution time for asynchronous adders and subtracters increases with increasing word length, keeping short word lengths allows the circuit to run at acceptable speed without having to pay a premium either for a higher speed grade FPGA or more expensive dedicated logic devices. Since ASICs run more quickly than FPGAs do and have fewer restrictions on numbers of gates, these considerations may not be as important in ASIC implementations of the invention.

3.3.2.4. FIFO Specific Implementation

Figure 7A:
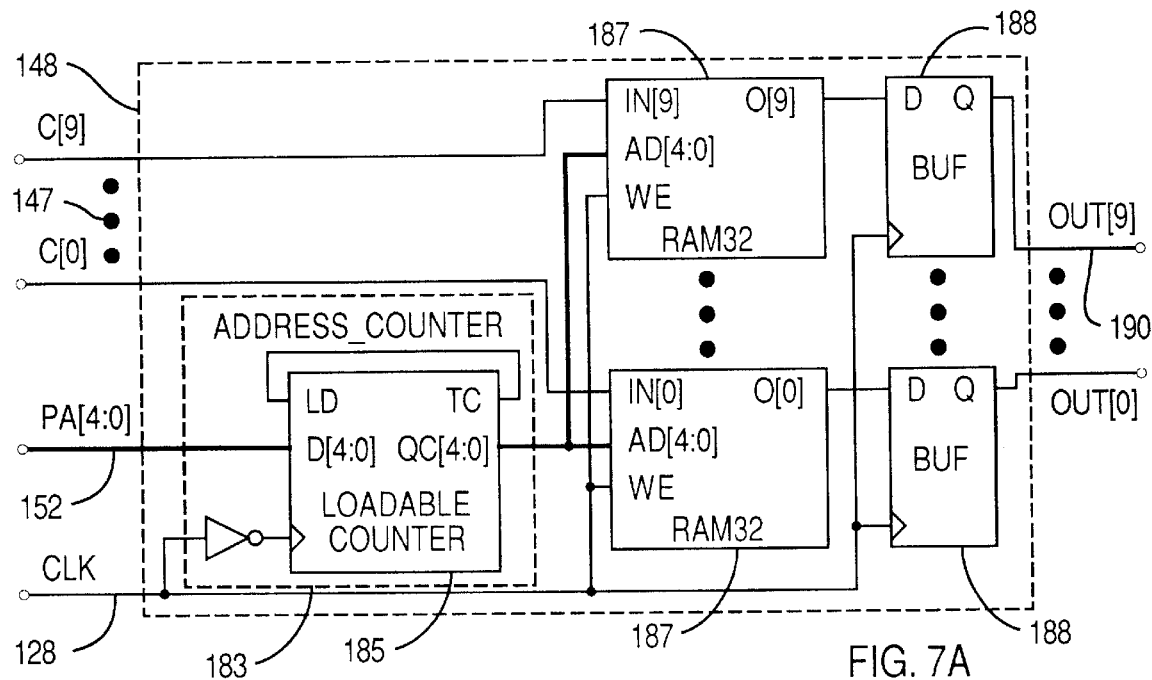
FIG. 7A is a circuit schematic of a representative embodiment of the FIFO 10 hardware block of FIG. 6A.
Figure 7B:
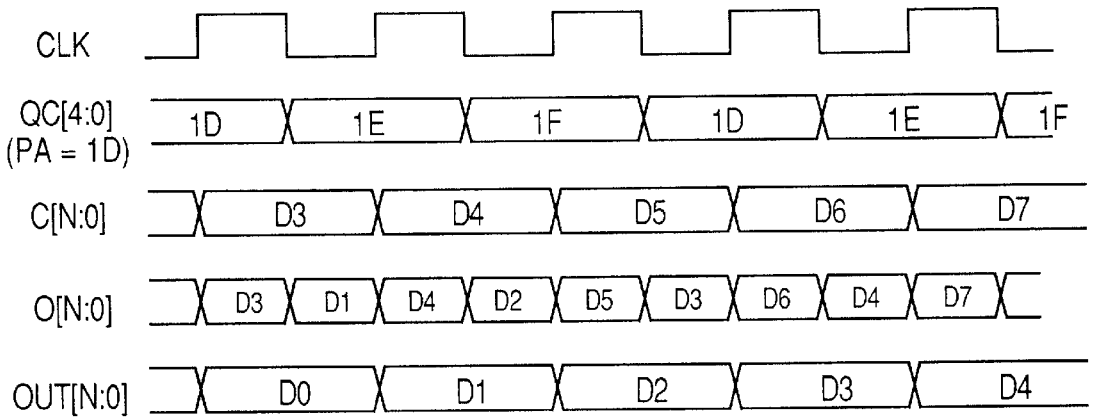
FIG. 7B is a timing diagram illustrating the operation of the circuitry of FIG. 7A.

FIG. 7A shows a specific implementation, using a Xilinx 4000 series FPGA, of the FIFO 148 in the slow filter 98, with FIG. 7B showing associated waveforms for $L_s$ equal to the value 3. The other FIFOs in the design are implemented similarly. The FIFO 148 starts with an address counter 183 comprising a loadable counter 185 driven by the inverted signal CLK 128 and having the parameter PA[4:0] 152 at its load input D. PA is actually supplied as the 2's complement of the desired filter length, so for Ls equal to 3, PA equals 1D in hexadecimal notation. On negative going CLK edges, the loadable counter 185 therefore counts from 1D up to 00. At this point it overflows and, since the overflow output TC is connected to the load enable input LD, resets itself to output 1D. This cycle repeats indefinitely. The output CQ[4:0] of the loadable counter 185 is used to address the 10 memory cells 187. These cells are 32 bits deep and implemented using the Xilinx FPGA's configurable logic blocks (CLB's) as memory. As soon at their addresses are changed, on the negative going CLK 128 edge, they display their stored values O[9:0], as shown in FIG. 8B. The next positive going CLK edge transfers the stored values to the buffers 188 and activates the write enable lines WE of the memories 187 to store the current value of the input data C 147. At this point the output values O[9:0] change to the current C[9:0] input values, but the buffers have already captured the delayed C[9:0] values. In this manner, by inverting the CLK 128 input to the address counter 183, it is possible to both read delayed C[9:0] data values from the memory and write current C[9:0] data value to it in a single CLK cycle. This is an important detail, since it essentially doubles the speed at which the FIFO, and hence the FiPPI, can operate. The buffer outputs Q present the delayed C[9:0] data signal OUT[9:0] 190 to the subtracter stage 150.

3.3.3. Fast Filter

The fast filter 105 is implemented in exactly the same way as the slow filter except that it has its own control parameters F_Length and F_Gap 112 and works directly with the 10 bit output 50 of the ADC 48 rather than with the 10 bit output C[9:0] 147 of the decimator 97. Its peaking time and gap length, from Eqn. 2 are written as $L_f$ and $G_f$, the subscript f signifying "fast."

3.3.4. Theory and Implementation of Pileup Inspection 3.3.4.1. Background and Terminology Before the operation of the peak detector module 107 and pileup detector module 108 can be understood, it is necessary to understand how the pulse outputs of the slow filter 98 and fast filter 105 change as a function of the time interval between consecutive input pulses from the preamplifier 20. FIGS. 8A–8G present the information of interest. FIG. 8A presents superimposed traces of the fast filter's output 192 and the slow filter's output 193 for two well separated input pulses. The former are two narrow, nearly triangular pulses while the latter are two broader, trapezoidal pulses which are so well separated that the slow filter output returns to the baseline between them. Because the time required for the slow filtering exceeds that for the fast filtering, the midpoints of the slow peaks trail the fast peaks by the "sampling time" TS 194, as shown. As the separation between the pulses decreases, as shown in FIGS. 8B–8C, the slow filter output pulses no longer return to the baseline, but their amplitudes, as sampled at times TS 194 after the fast peaks, still remain valid representations of the associated x-ray energies. Eventually, however, as the interval between the two pulses continues to decrease, a point is reached where the slow peaks have overlapped to such an extent that the amplitudes cease to properly represent the associated x-ray energies. This is indicated in FIG. 8D. These pulses are said to be piled up and must be excluded from the output spectrum. As the interval between the pulses continues to decrease, the fast pulses will also eventually overlap, as shown in FIGS. 8E–8F. In the limit, as shown in FIG. 8G, two pulses can occur so closely spaced that they become indistinguishable from a single pulse with their summed amplitude.

3.3.4.2. Peak Detection Theory

The first issue is to detect the arrival of pulses and specify their arrival times, which is the function of the peak detector 107. Its intended operation can be understood by reference to FIG. 8A. The traditional approach to detecting the arrival of a pulses in x-ray spectrometry has been to set a voltage threshold 195, compare the amplitude of the fast filter output 192 to it, and define the instant that the amplitude exceeds the threshold as the arrival time. Circuits performing this function are called discriminators, and, while they are widely used because they are easy to implement, they have certain disadvantages. The first is that any event which crosses the threshold triggers the discriminator output, whether it is a true signal event or just a noise event. Therefore the threshold must be set significantly above the circuit's noise floor in order to keep the false trigger rate down to acceptable levels. Because short shaping times are needed in the fast channel to maximize pileup rejection, the fast channel is inherently noisy, requiring in turn that the discriminator threshold be set fairly high, making it difficult to detect low energy x-rays whose fast peaks do not rise very high above the baseline noise. The second problem is that the detection time is not well defined, in any absolute sense, relative to the pulse's actual arrival time. This is because the point at which a peak in the fast channel crosses the discriminator threshold is strongly dependent both upon its amplitude and the magnitude of the noise. A large amplitude fast peak rises sharply from its baseline and crosses the threshold very shortly thereafter. A lower amplitude peak rises more slowly and takes a longer time to cross the threshold. It may even move back and forth across the threshold several times if noise levels are large compared to its amplitude. A still lower amplitude peak, as noted above, may not actually cross the threshold at all. These fluctuations in threshold crossing time with peak amplitude are generally referred to as "amplitude jitter" and "noise jitter" and interfere with making an accurate definition of the sampling time TS 194.

While we have used simple discrimination on either the increasing or decreasing sides of the fast pulses in various implementations of the invention, the approach presented here in the specific embodiment is advantageous and is usually preferred. As above, a threshold level 195 is set. However, instead of recognizing as a peak any single voltage value which exceeds the threshold, we require that a number min_width 113 of consecutive signal values exceed threshold before a voltage fluctuation is recognized as being a valid fast peak. This results in a peak detection scheme which whose sensitivity to high frequency noise fluctuations can be readily adjusted and which allows the threshold level to be set much closer to the noise than is possible for a simple discriminator and still achieve acceptably low rates of spurious trigger events. This is particularly advantageous when working with very low energy x-ray pulses which may not rise many standard deviations above baseline noise. Both the parameter min_width 113 and the threshold parameter 113 which produces the threshold level 195 are loaded into the FiPPI from the DSP 27. In the specific embodiment min_width has typically been set to 3 or 4 for good noise rejection with x-rays in the 5–10 keV range. In any case it must be set less than $L_f$ so that the peak location circuitry can function properly, as described below.

In addition, in the specific embodiment, the location of a fast peak is determined not by its first crossing of the threshold 195, but rather by the location of its maximum value T3 196. Referring to FIG. 8A, T3 is found by assigning the amplitude of the first point which crosses threshold 195 to the variable MAX and then replacing the value in MAX with each successively larger value which is encountered during the time TW that the peak exceeds threshold. Each time the value MAX is replaced, the counter which measures the sampling time interval TS 194 is also restarted. The process of locating the arrival time TS 196 of a peak's maximum is now independent of its amplitude, greatly reducing time jitter. The only time jitter in the process now arises from noise superimposed on the signal. This effect is uncorrelated with pulse amplitude and cannot introduce any energy dependent skewing into the determination of the slow channel peaks' amplitudes.

3.3.4.2. Pileup Inspection Theory

The second issue, once a peak has been detected, is to capture its amplitude in the slow channel and determine whether this captured value is a valid measurement of the associated x-ray's energy. Capturing the slow peak amplitude is conceptually straightforward. FIG. 8A shows that all that is required is to record the slow channel value at the time T4 198 which is in the midpoint of the trapezoid's flattop region. Because the same input signal (see, for example, trace ADC in FIG. 10B) is processed by both the fast channel and the slow channel and the digital operations involved are discrete and fixed in number, the sampling point T4 198 is always separated from the fast peak's maximum T3 196 by a constant, fixed time TS 194 which depends only on such FiPPI control parameters as D_Factor 102, S_Length and S_Gap 103, and F_Length and F_Gap 112. Thus, once a fast peak has been detected, a counter can count off the time TS 194 and the output of the slow filter 98 transferred to the output buffer 100 (see FIG. 4). Exclusive of jitter in the determination of T3 196, this transfer will always occur precisely at T4 198. Even if noise problems in the fast channel are severe, however, the slow filter gap can always be increased sufficiently by increasing S_Gap 103 so that even with jitter, the measurement time TS 194 never falls outside the slow trapezoid's flattop region.

Pileup rejection in analog spectroscopy circuits is commonly implemented by requiring that successive pulses, as detected in the fast channel, must be separated by some multiple of the slow channel peaking time. In the case of analog triangular filtering, a multiple of 1.5 is commonly used. The specific embodiment implements a similar test digitally. An examination of FIG. 8A shows that, in principle, for truly triangular filtering, successive pulses need only be separated by a single slow filter peaking time. For trapezoidal pulses, the separation must be only the peaking time plus half the flattop time. The separations of 1.5 peaking times or longer commonly used in analog systems are to account both for the jitter effects discussed above in determining the arrival times of fast pulses and for the fact that analog "triangular" pulses do not terminate sharply, but instead have tails that extend on significantly beyond one peaking time on the decaying side of the peaks. Digitally generated pulses terminate cleanly, as shown in FIG. 6B, however. This allows the shorter pileup rejection times to be used and thus can significantly increase count rate capability by 20% or more over analog spectrometers. The actual inspection is implemented as shown schematically in FIG. 8D, where the "next neighbor" time TN 199 is measured between the peak of one fast pulse and the arrival of the next, as determined by the min_width test 113. If TN exceeds the parameter value Interval 115, then the peaks are adequately separated and not piled up. For a given pulse, pileup can obviously occur if either its preceding or following pulse is too close, so both conditions must be tested. While the interpulse time could be measured somewhat more accurately "peak to peak" than "peak to arrival", the additional circuitry was not judged to be worth the small fractional increased count rate that would result in the specific embodiment.

A second pileup test implemented in the specific embodiment has been recognized but not commonly used in analog spectrometers due to its difficulty of implementation using analog circuitry. As shown in FIGS. 8E–8F, once the separation between successive fast pulses falls below about $2L_f+G_f$ (two fast risetimes plus one gap time), the signal no longer returns to baseline between them and so the above implemented test for pulse arrival time fails to distinguish them as two peaks rather than one. The specific embodiment tests for this condition of "fast pileup" are done by measuring the width TW of each fast pulse and comparing it to a "maximum width" parameter TM 200 which is loaded from the DSP as Max_Width 115 and equals approximately $2L_f+G_f$. As shown in FIGS. 8E–8G, this strategy produces effective pileup rejection until the two pulses are so close together that they are essentially indistinguishable from a single, larger amplitude pulse. For synchrotron spectroscopy applications, where the range of detected x-ray energies is small and parameter TM 200 can be optimized for that specific energy range, this is a very effective test, particularly considering that it only requires one gate and one counter to implement.

Even in general spectroscopy applications, where x-ray energies vary widely, however, the digital embodiment of the "maximum width" test is more efficient than its analog counterparts. This is primarily because our peak detection scheme of "min_width samples above threshold" allows the threshold to be set much closer to the noise floor than in the single level crossing detection schemes which are usually employed in analog systems. Lower thresholds result in smaller variations in pulse width at threshold crossing with x-ray energy, since the baseline width from a digital fast triangular or trapezoidal filter is equal to $2L_f+G_f$, and is energy independent. This allows parameter TM 200 to be set just slightly larger than $2L_f+G_f$ and still capture a large fraction of fast pileup peaks even at fairly low energies.

3.3.4.3. Baseline Capture Theory

The final function of the pileup checker is to identify regions when no slow peaks are present, that is, when the slow filter output has returned to its baseline level. These baseline values are one means for establishing the "zero" level from which peak values are to be measured. It is therefore important to be able to sample the baseline from time to time in order to determine its value accurately and monitor changes in its value with time or changing operational parameters. The details of this procedure are discussed in detail in the above referenced application by Warburton et al. entitled "METHOD AND APPARATUS FOR DIGITALLY BASED HIGH SPEED X-RAY SPECTROMETER" (Attorney Docket 17032-1-2). To measure baseline values, it is first necessary to establish that no pulse is present in the slow filter output FS[11:0] 173 and then capture a value of F[11:0] in the output buffers 100 for transfer to the DSP 27. The principle for establishing that F[11:0] has returned to baseline is nominally straightforward: if a time interval equal to twice the slow filter's risetime plus its gap time has passed since the last peak was detected, then the slow filter will have had adequate time to return to baseline.

When working with very low energy x-rays, measuring fast peak widths at a fixed threshold value becomes less effective as a pileup test because the threshold may then be a sizable fraction of the peak amplitude. For example, if threshold is 60% of the peak amplitude, the peak's width at this point is only 40% of its true baseline width. Thus there is a wider range of times over which it can pile up with another low energy x-ray and still have the sum of their two widths be less than the base width test value. For this case we have developed a novel test wherein the peak's width is measured at a fixed fraction (e.g., 50%) of its maximum value. This corresponds to generating a time variant threshold for each peak width test and makes the accuracy of the test independent of the peak's amplitude. Because this test requires more complex circuitry than the simple basewidth test, it is only optionally implemented in those cases where it is significantly beneficial.

3.3.5. Peak Detector Specific Embodiment

Figure 9A:
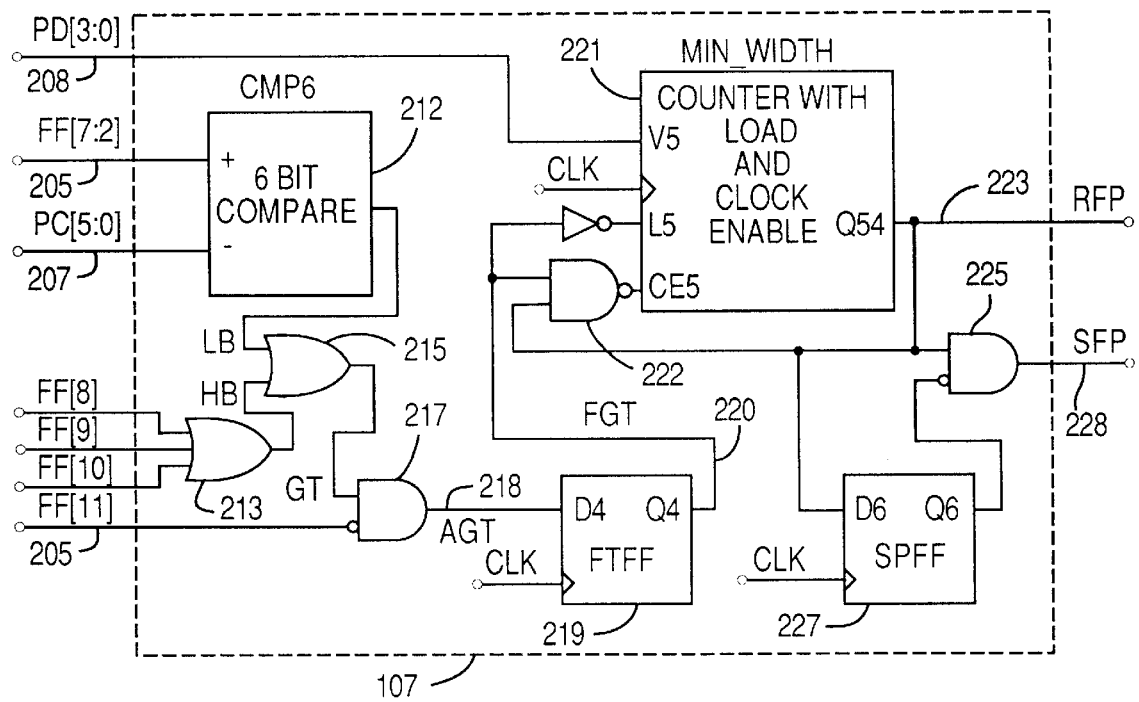
FIG. 9A is a circuit schematic of a representative embodiment of the Peak Detector hardware block of FIG. 4.
Figure 9B:
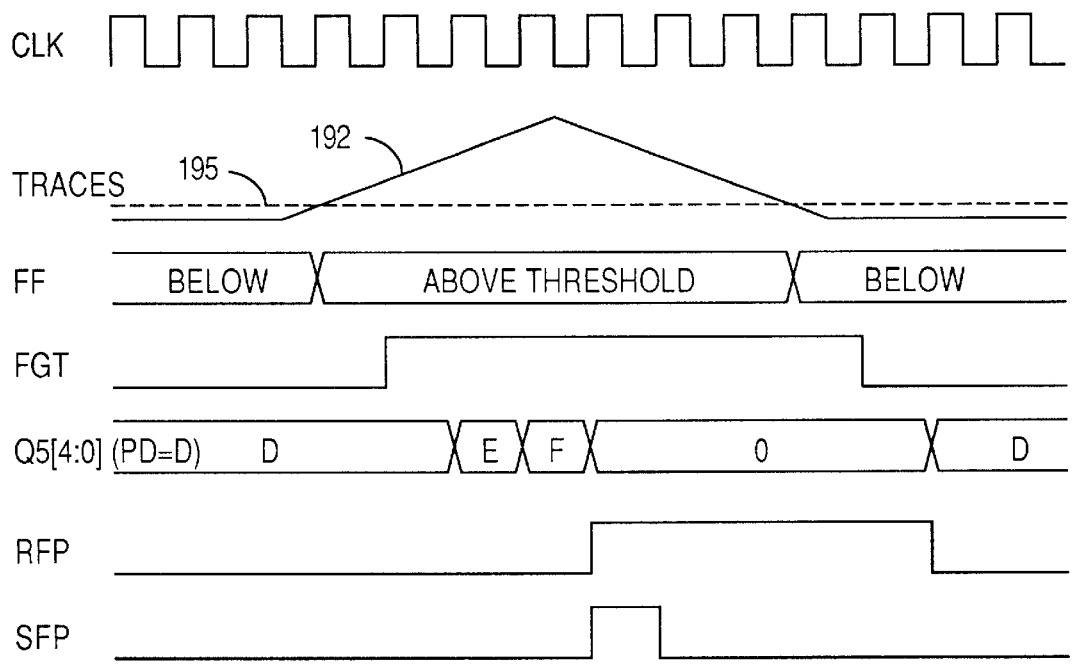
FIG. 9B is a timing diagram illustrating the operation of the circuitry of FIG. 9A.

FIG. 9A is a circuit schematic of a specific embodiment of the FiPPI peak detector 107. Its inputs are the 12 bit fast filter output FF[11:0] 205 (see slow filter output FS[11:0] 173 for comparison), a 6 bit input parameter PC[5:0] 207 corresponding to threshold 195 and the 4 bit parameter PD[3:0] 208 corresponding to the peak detection parameter min_width 113. To minimize FPGA real estate usage, the comparison to the threshold is split into two parts. The lowest two bits of F[11:0] are ignored, since they are expected to be noise bits. The next 6 bits F[7:2] 205 are compared to PC[5:0] 207 by a 6 bit comparator 212. An OR gate 213 directly tests to see if one or more F bits 8 through 10 are unity. OR gate 215 tests if either condition is true and feeds into AND gate 217 which also tests that F[11] is 0 to be sure F[11:0] is positive (in the specific implementation, the 2's complement sign convention is employed). If all these conditions are met, then the signal AGT 218 goes to logic 1 to signal that the threshold has been exceeded. A flipflop FTFF 219 synchronizes this determination: its output FGT 220 goes to 1 on the next clock cycle after threshold is exceeded, as shown in FIG. 9B and returns to 0 on the next clock cycle after this condition terminates.

The test that the fast filter output exceeds threshold for Min_Width 113 cycles is implemented using a counter 221 with load and clock enable. Q54 is the output of the counter's overflow flipflop. The 4 bit parameter PD[3:0] 208 representing Min_Width 113 connects to the counter 221's load input V5. The threshold test result FGT 220 is connected inverted to the counter 221's load enable input L5 and to one input of a NAND gate 222 connected to counter 221's clock enable input CE5. The other input of NAND gate 222 is tied to counter 221's overflow bit Q54. This output is the "real fast pulse" signal RFP 223. Q54 also feeds into an AND gate 225 and the load terminal D6 of a flipflop SPFF 227, whose input is also fed inverted to AND gate 225. The output of AND gate 225 is the "start fast pulse" signal SFP 228.

This circuit works as follows, with representative signal traces shown in FIG. 9B for the value Min_Width 113 equal to 3. As long as output F[11:0] 205 is below threshold PC 207, then signal FGT 220 is 0 and counter 221 is continuously reloaded with the value PD 208, which is the 2's complement of the Min_Width 113 count number. Once F exceeds PC and FGT becomes 1, then counter 221 starts counting. When counter 221 overflows, signal RFP 223 goes to 1, which disables the counter via NAND gate 222. Since the output of flipflop SPFF 227 is still 0, the output of AND gate 225, the signal SFP 228, also goes to 1 at this time. On the next clock cycle the output of flipflop SPFF 227 goes to 0 as does the signal SFP 228. When output F[11:0] 205 drops back below threshold PC 207, output FGT 220 returns to 0 on the next clock cycle and signal RFP 223 follows on the next. On the clock cycle when output FGT 220 returns to 0, counter 221 returns to the state where parameter PD[3:0] 208 is being constantly reloaded as the peak detector 107 waits for the next fast peak.

To summarize, output FGT 220 lags the "peak above threshold" test by one clock cycle. The "real fast peak" signal RFP 223 goes to 1 when the "min_width test" is met and goes back to 0 one clock cycle after FGT 220. The "start fast peak" signal SFP 228 goes to 1 at the same time as signal RFP 223 but stays high for only a single clock cycle.

3.3.6. Pileup Checker Implementation

Figure 10B:
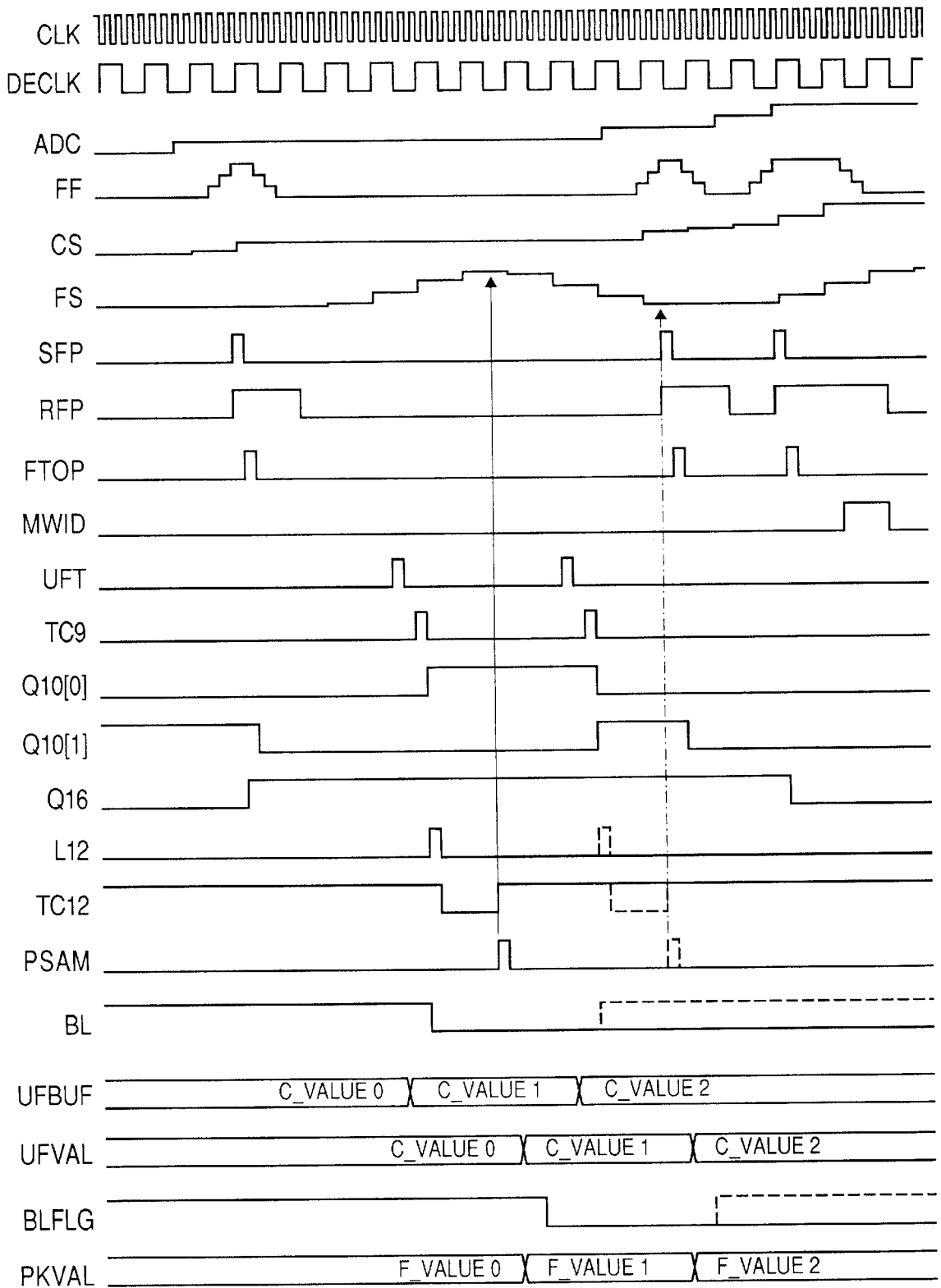
FIG. 10B is a timing diagram illustrating the operation of the circuitry of FIG. 10A.

The pileup checker 108 comprises four principle subcircuits: a peak center finder 240, a maximum fast peak width inspector 242, a dual interval timer 243, and a peak capture counter 245. FIG. 10A shows these circuits and also the output buffers 100. The operation of the buffers 100 will be discussed in this section because their triggering is intimately connected to the operation of the pileup checker and they are otherwise well understood to those skilled in the art of digital electronics. FIG. 10B shows representative traces of signals at several labeled points in the circuits of FIG. 10A. "ADC" is the output signal on ADC bus 50 from the ADC 48, FF is the output of the fast filter 105, CS is the output of the decimator 97, and FS is the output of the slow filter 98. We note that x-ray events, which occur as single steps in the signal ADC, often become double steps in the decimator output CS because their arrival time can occur at any point in the decimation averaging cycle. This, in turn, stretches the fast filter output FS by one cycle and requires care to assure that peaks in FS are sampled at their true maxima.

3.3.6.1. Peak Center Finder

The peak center finder 240 accepts fast filter output FF[11:0] 173 the "start fast peak" signal SFP 228, and the "real fast peak" signal RFP 223. FIG. 10B shows representations of these signals for the case of a well isolated peak followed by three piled up peaks, the second pair of pileups being so close together that they are not resolved in the fast channel. The 9 most significant bits of FF[11:0] 173 feed into the input V7 of a resettable buffer 250 and into the + input of a 9 bit comparator CMP7 252, whose—input accepts the output Q7 251 of the buffer 250. The comparator's output feeds into the input D8 of clocked flipflop FF8 253 and the buffer's clock enable CE7. The signal SFP 228 feeds into the "reset" input R7 of the buffer 250, while the signal RFP 223 feeds into the "enable" input EN7 of the comparator 252. When the peak detector 107 finds a fast peak, signal SFP 228 goes to 1 for one CLK cycle and resets the buffer 250 to zero. Because signal RFP 223 is 1 as well, the comparator is now enabled. Thus each time a larger value of FF[10:2] arrives the comparator output goes to 1 and two things happen. First, the buffer 250 is enabled via CE7 and captures the new value of FF[10:2]. Second, the input D8 to FF8 253 is 1 and so the output Q8, the signal FTOP 255 goes to 1 on the next CLK transition. This continues until the maximum value of FF[10:2] is found. After this, the output of the comparator 252 is 0 and so is FTOP 255 on all following CLK cycles. The output Q7 251 of the buffer 250 retains the peak value found until such time as another peak is detected. Traces of FF, the slow filter output FS (in bold), RFP and FTOP show these transitions in FIG. 10B.

3.3.6.2. Dual Interval Timer: Inspection for Peak Pileup

The dual interval timer 243 consists of an interval counter 260 with load and clock enable, a 2 bit counter 261 with reset and clock enable, an 8 bit comparator CMP23 262, a flipflop FF11 263, a flipflop FF16 265 with clear and clock enable, and assorted logic gates. The dual interval timer 243 begins its action when FTOP 255 goes to 1. Acting through an OR gate 267 this loads the parameter PF[7:0] 268 into Interval_1 counter 260. PF[7:0] is the 2's complement of the desired inspection interval TN 199 shown in FIG. 8D. FTOP 255 also resets the 2 bit counter Pass_Cnt 261 through its reset input R10, making both its output signals Q10[0] 270 and Q10[1] 272 equal to 0. When signal FTOP 255 finally returns to 0, Interval_1 counter 260 ceases loading PF[7:0] since its overflow output TC9 273 is also equal to 0. Because signal Q10[1] 272 has been reset to 0, the clock enable input CE9 to interval counter 260 will be enabled through an inverter 275. Interval_1 counter 260 thus begins counting from PF[7:0] 268 up to 0. If no pileup event intervenes, it reaches 0 and its overflow output TC9 273 goes to 1 as shown in FIG. 10B. This means that the related x-ray pulse has no trailing edge pileup and may be a good event. Overflow output TC9 273 going to 1 precipitates four actions. First, through CE10, it enables the clock to the 2-bit counter Pass_Cnt 261 for one CLK cycle, causing signal Q10[0] 270 to go from 0 to 1, marking the first completion of an inspection interval TN 199. Second, through the OR gate 267 it reloads PF[7:0] into the Interval_1 counter 260, which will start counting a second time, since its CLK is still enabled. Third, through CE15, it enables the CLK 128 to a flipflop FF15 277 for one CLK cycle so that its output Q15 can store the current value of signal Q10[0] 270 (in this case 0) as the flag BL 278 to signal that this is a peak capture event. Fourth, acting through AND gate 282 and assuming that the test condition TST 283 is 1, it causes the output of a synchronizing flipflop FF11 263 to go to 1 for one CLK cycle on the next CLK cycle.

Test condition TST 283 comes from the logic gates 285, which, since signal Q10[0] 270 is 0, test that the output Q16 of the flipflop FF16 265 is 1. Flipflop FF16 265 stores the result of this x-ray pulse's leading edge pileup test, which was previously determined as follows. When a pulse is first detected, as signaled by signal SFP 228, FF16 captures the output of an OR gate 288, which OR's the values of signals Q10[0] 270 and Q10[1] 272 at that instant. Both would be 0 only if Interval_1 counter 260 had not counted at least one inspection time interval TN 199 since the arrival of the previous pulse, which would mean that the pulse has leading edge pileup. Otherwise the pulse has no leading edge pileup and a 1 value is stored.

3.3.6.3. Peak Capture Counter

The output Q11 of flipflop FF11 263 therefore goes to 1 for a single CLK cycle whenever a good peak, having neither leading nor trailing edge pileup, is detected. This signal activates the peak capture counter subcircuit 245. Through the load input L12, it loads the parameter PG[7:0] 290 into an Interval_2 counter 292. PG[7:0] is the 2's complement of the difference between the parameters TS and TN in FIGS. 8C–D. That is, Interval_1 counter 260 has just completed counting time TN 199, so Interval_2 counter 292 completes the job of counting out the sampling interval TS 194. This process, once initiated, continues to run independently of the operation of the dual interval timer block 243, which may be reset at any moment by the arrival of another pulse. When Interval_2 counter 292 counts up to 0, its overflow TC12 293 disables its own input CE12 through an inverter 294. Also, through a flipflop FF13 295 and an AND gate 297, it generates a single clock width pulse, the sampling signal PSAM 298, on the next CLK cycle. PSAM sets an S-R flipflop FF14 300, whose output Q14 is the DSP interrupt flag DSP FLAG 302, which signals the DSP 27 that the FiPPI 25 has captured a value and requires service. Once the DSP 27 has read the captured values it resets flipflop FF14 300 using the FLAGRESET signal 303.

3.3.6.4. Dual Interval Timer: Unfiltered Decimator Value Capture

The other principal function of sampling signal PSAM 298 is to activate the output buffer 100 to capture slow channel values for output to the DSP 27. Three values are required: the peak value from the slow filter output FS[11:0] 173, which corresponds to the x-ray's energy; a flag value which indicates to the DSP whether this is a peak or baseline value, as will be described below; and a sample of the unfiltered slow channel input signal (i.e., either the decimator output CS[9:0] 147, or, if less accuracy is acceptable, the ADC output bus signal 50) just after the x-ray's arrival. This unfiltered signal may be used in an energy correction scheme for use with continuous feedback preamplifiers, as described in the application of Warburton entitled "METHOD AND APPARATUS FOR DIGITALLY BASED HIGH SPEED X-RAY SPECTROMETER FOR DIRECT COUPLED USE WITH CONTINUOUS DISCHARGE PREAMPLIFIERS" (Attorney Docket 17032-1-3). The first two signal values are now readily available. The generation of sampling signal PSAM 298 has been timed precisely to sample the maximum value of output FS[11:0] 173, as described above. The value of flag BL 278 has been stored in flipflop FF15 277, also as described above.

Obtaining a value of the unfiltered decimator output CS[9:0] 147 which will always be valid requires additional circuitry. The difficulty is one of timing when two non-piled up pulses arrive in very close succession. As may be seen by counting CLK pulses in FIG. 10B, an x-ray pulse may be detected (SFP goes high) as shortly as 5 CLK cycles after the pulse's arrival. With longer decimation counts, as also shown, CS may not yet have settled to its new value. Hence SFP (and similarly RFP and FTOP) cannot be used to sample CS. On the other hand, by the time overflow output TC9 273 goes high, CS may already have started to rise again for the next x-ray pulse if it follows very closely. Thus neither TC9 nor PSAM can be used to sample CS either.

This issue is resolved by the use of the 8 bit comparator CMP23 262, which compares the count output Q9 of Interval_1 counter 260 to the parameter PH[7:0] 305. By setting PH[7:0] to a smaller number than parameter PF[7:0] 268, CMP23 262 can be made to output a single timing pulse UFT 306 any number of CLK cycles desired before overflow output TC9 273 goes high. Thus decimator output CS[9:0] 147 can be guaranteed to be captured after it has settled for the x-ray pulse of interest but before it can begin to rise again for a following pulse. This capture is accomplished by a 10 bit buffer 307 which has UFT attached to its clock enable CE24 and decimator output CS[9:0] 147 attached to its input D24. Its output Q24 carries the captured, unfiltered decimator signal UFBUF 308.

3.3.6.5. Output Buffer Triggering

The sampling signal PSAM 298 strobes the output buffer 100, by enabling the CLK 128 for one cycle to a 12 bit buffer 310, a 1 bit buffer 312, and a 10 bit buffer 313 through their respective clock enable inputs CE17, CE18 and CE19. This captures the instantaneous values of the slow filter output FS[11:0] 173 and the stored flag and unfiltered decimator output values BL 278 and UFBUF 308. FIG. 10B shows this capture time as a solid vertical line at the leading edge of the PSAM pulse. We note that the latter two values are essentially double buffered. The reason for this is to assure that the DSP 27 has time to read the output buffer 100 before its values can be changed again. Thus, for example, while at least 0.5 μs must elapse between successive PSAM pulses, there is no guarantee about how shortly after a PSAM pulse the next UFT 306 pulse can occur. Thus, if UFBUF were not double buffered, its value in 10 bit buffer 313 could possibly change between the time signal DSPFLAG 302 told the DSP 27 that new values had arrived and the time the DSP was able to read them.

Although the circuitry is not shown in this specific implementation, we have found it to be advantageous, in systems designed for the highest counting rates, to replace the three output buffers 100 by three short FIFOs, each capable of storing several captured values. In the specific implementation shown, the DSP 27 must respond to the DSPFLAG 302 in a time less than a peaking time TPK 175, if no additional dead time is to be added to the system's overall response. In this specific implementation, the DSP 27 can respond to an interrupt and capture a set of data values in slightly less than 0.5 μs, which sets a lower limit on the shortest allowed value of TPK 175. If, on the other hand, FIFOs are used in buffer 100, then the DSP can operate in polling mode to sense when DSPFLAG 302 is raised and then proceed to offload as many sets of data values as may have accumulated between the time DSPFLAG 302 is first raised and the time DSP 27 actually responds. We have modeled this operation and found that, if the DSP 27 polls DSPFLAG 302 at least once per event it processes, and is fast enough to process events at their average rate, then this buffer need only be about 4 events deep to capture the vast majority of all events. While this design is more complex and expensive than the specific implementation shown, it has two benefits. First, since interrupt response time is typically a fixed number of DSP clock cycles, this allows a slower, and hence cheaper, DSP to be used for a given minimum peaking time design. Second, since polling mode is more efficient than interrupt mode, in that fewer clock cycles are required to transfer each set of data values, faster overall data rates can therefore be accommodated for a given DSP. The resulting tradeoff between a faster DSP and a more complex FiPPI design is therefore an engineering issue to be decided on a case by case basis.

3.3.6.6. Dual Interval Timer: Inspection for Good Baseline

Next, assuming that no further x-ray pulse is encountered, the Interval_1 counter 260 finishes counting to time TN 199 a second time, again causing the overflow output TC9 273 to go to 1 for one cycle. This means that the output of the slow channel filter has returned to baseline and precipitates the same 4 actions as before: reloading Interval_1 counter 260, advancing counter Pass_Cnt 261 by 1 count, causing flipflop FF15 277 to capture the current value of signal Q10[0] 270 (in this case 1) as the flag BL 278, and, if test condition TST 283 is 1, restarting Interval_2 counter 292 through load input L12 290. In this case, however, since signal Q10[0] 270 is 1, logic gates 285 output a TST 283 value of 1 only if the DSP 27 wants to record a baseline value, as signaled by setting signal BLCOL 315 to 1. This case is depicted by the dashed traces in FIG. 10B. Once again load input L12 290 reloads Interval_2 counter 292, whose overflow TC12 goes low until the counter counts up to zero. This disables the counter and issues another sampling signal PSAM 298. As before, PSAM causes both the DSP interrupt signal DSPFLAG 302 to be set and, through the output buffers 100 captures the instantaneous values of the slow filter output FS[11:0] 173, and the stored baseline flag (1 in this case) and unfiltered decimator output value (BL 278 and UFBUF 308) as the output values PKVAL 117, BLFLG 120, UFVAL 1118. FIG. 10B shows this capture time as a vertical dashed line. The differences between this case and the peak detect case are that flag BLFLG 120 is 1, the value PKVAL 117 has been obtained at a point where the output of the slow filter is known to have returned to its baseline, and the value of UFVAL 118 is obtained about one sampling time TS 194 later than before. The DSP 27 uses the value of flag BLFLG 120 to distinguish between peak capture and baseline capture events. We observe that the DSP 27's request for a baseline sample, as expressed by setting signal BLCOL 315, may not be met immediately since a sequence of closely spaced pulses may prevent the slow filter's output from returning to baseline. This is particularly likely at high counting rates. The signal BLCOL 315 remains set however, and will eventually capture a baseline value. The value of flag BLFLG 120 being 1 identifies this captured value to the DSP 27. We have not shown the simple circuitry which performs an AND of sampling signal PSAM 298 and flag BL 278 to reset signal BLCOL 315 to 0 to stop further baseline collection attempts until re-initiated by the DSP 27.

In alternative baseline collection procedure which we have also implemented, but do not show here, the circuitry of FIG. 10A is modified slightly so that the baseline values are always captured whenever the Interval_1 counter 260 times out a second time, but without raising the DSP FLAG 302. The implemented intervals between timeout and capture have been both fixed and variable. With this circuit, the DSP 27 then simply reads the output buffers 100 when it wants a baseline sample and tests BLFLG 120 to see if the values it has captured are indeed a baseline event. This saves the DSP 27 from having to test the value of BLFLG 120 each time it is interrupted, since interrupts then only occur for peak captures. Even though this test only takes a few instructions, its removal can significantly reduce the average computation time per pulse and increase throughput accordingly at high data rates, where the ratio of peak to baseline samplings becomes large.

3.3.6.7. Maximum Fast Peak Width Inspector

Regular pileup events are detected by the dual interval timer 243 as discussed above. Every time a new x-ray pulse is detected, the signal FTOP 255 restarts the dual interval timer 243, independently of how far in its previous counting cycle it has progressed. In particular, if it has not managed to complete counting the inspection interval TN 199, then pileup has occurred. The previous peak has trailing edge pileup and is ignored (no overflow output signal 273 issued). In addition, the present peak has leading edge pileup, which information is stored in flipflop FF16 265 as discussed above.

Fast pileup is detected by the maximum fast peak width inspector 242, which comprises a Max_Width counter 320 with load and clock enable. When a fast peak is found, the signal RFP 223 goes to 1. It is connected to Max_Width counter 320's load input L20 via inverter 322 and stops loading parameter PE[7:0] 323, which is the 2's complement of the Max_width 115 parameter TM shown in FIGS. 8E–G. AND gate 325 ensures that Width_counter counts only while RFP 223 is 1 or until the counter overflows. If RFP returns to 0 before Width_counter reaches TM then nothing happens: the fast peak was not piled up. If Width_counter overflows, however, then the fast peak was piled up. In this case the signal MWID 327 from its output Q20 causes the pileup status flipflop FF16 265 to reset immediately. The output Q16 of FF16 being equal to 0 causes this pulse to be treated as if it had leading edge pileup and be rejected since the test condition TST 283 will be 0 so that overflow output TC9 273 will not be able to trigger Interval_2 counter 292, which will therefore not cause a sampling signal PSAM 298 to be generated.

3.3.7. Input Count Rate (ICR) Counter Implementation

Figure 11A:
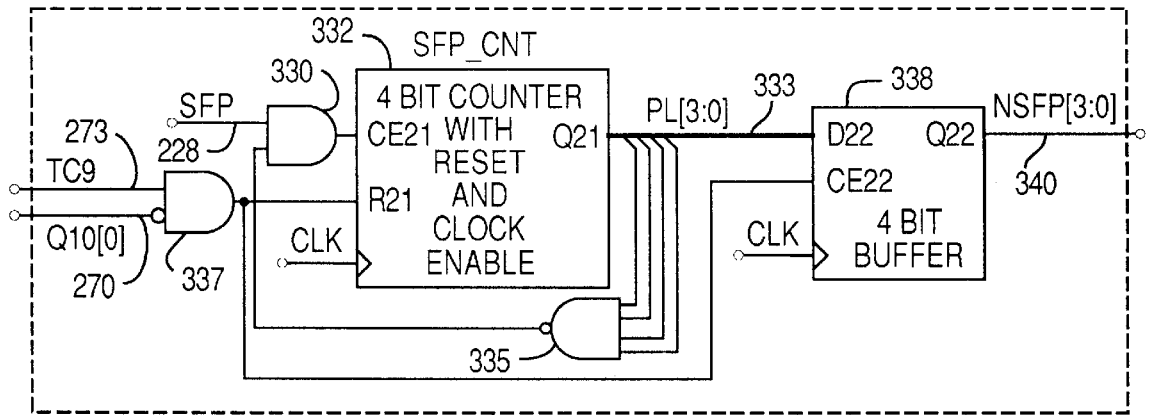
FIG. 11A is a circuit schematic of a representative embodiment of the Input Count Rate (ICR) Counter hardware block of FIG. 4.
Figure 11B:
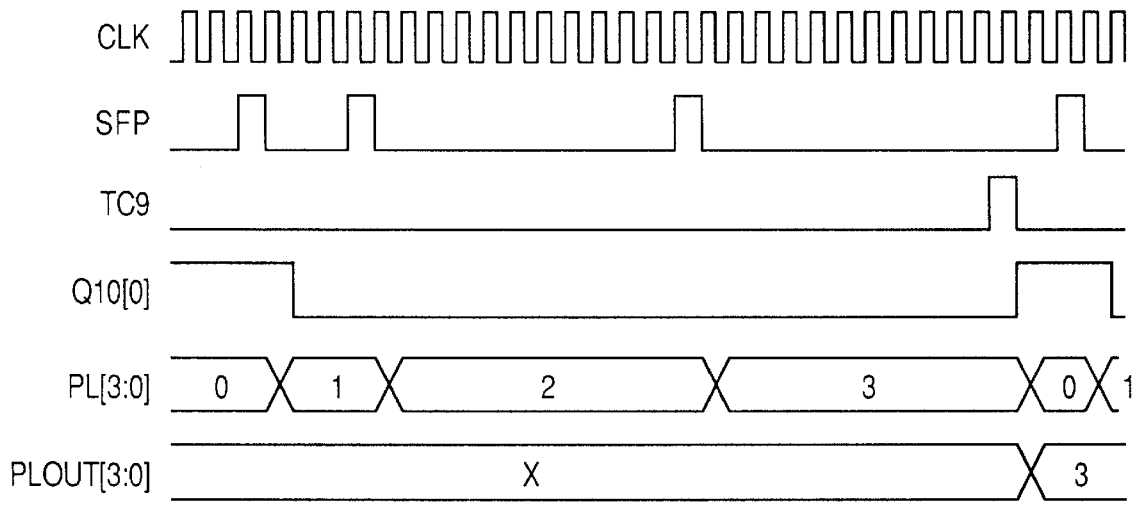
FIG. 11B is a timing diagram illustrating the operation of the circuitry of FIG. 11A.

FIG. 11A shows a specific embodiment of the ICR counter 110, with representative traces presented in FIG. 11B. The ICR counter 110 in the specific embodiment works by counting "start fast peak" pulses SFP 228. Since each SFP pulse which does not result in a good peak must correspond to a pileup event, the number of pileups between successive good pulses is just the number of SFP pulses minus one. Input signal SFP 228 enters into an AND gate 330 which feeds the clock enable CE21 of a 4 bit SFP_Cnt counter 332. Provided the counter's output PL[3:0] 333 is not all 1's, signal SFP 228 enables CE21 for 1 CLK cycle, incrementing 4 bit counter 332's output by one count. This continues until either the counter reaches its maximum number (15), at which point a NAND gate 335's output goes to 0 and disables further counting via AND gate 330, or a good x-ray pulse is detected. In the good x-ray case, overflow output TC9 273 goes to 1 for one clock cycle while signal Q10[0] 270 is 0, which resets the SFP_Cnt counter 332 via an AND gate 337 to R21. On reset, AND gate 337's output simultaneously enables the clock enable CE22 of a 4 bit Buffer 338, which captures the instantaneous value of SFP_Cnt counter 332 just prior to reset. This value, NSFP[3:0] 340, is the number of detected x-ray pulses since the last good x-ray pulse was detected. Its value is transferred through a buffer to the DSP 27 as the named signal value PLOUT 119 by the sampling signal PSAM 298 in the same manner as, for example, the slow filter output FS[11:0] 173 is transferred to PKVAL 117 by 12 bit buffer 310.

In normal operation, the input count rate (ICR) should not exceed the output count rate (OCR) by more than a factor of about 4. At the OCR maximum, the ratio is 1.7, so a factor of 4 would constitute fairly serious overload. Providing for up to 15 SFP pulses per good x-ray pulse should therefore cover the vast majority of cases. The DSP 27 can monitor this value and warn the experimentalist if large values are consistently found.

Since this computation requires a certain number of DSP 27 operations, the instrument's maximum throughput rate can be increased if the DSP does not have to unload and process ICR once for each good peak detected. Therefore, when maximum processing rate is more important than having instantaneous information about ICR to OCR ratios, it can be beneficial to use a slightly different implementation. In this implementation, which is not shown, the number of bits in the ICR counter is increased and it is unloaded less often in the same manner as the livetime counter 121, which is only unloaded on request from the DSP 27 at sufficiently long intervals so that this operation and its associated computations add a negligible additional computing burden. The choice between these two designs is an engineering decision to be made based on the requirements of a specific application.

When desired, the accuracy with which the output of the ICR counter estimates the true ICR rate can be increased by also counting fast pileup events, since most fast pileups contain two x-rays but generate only a single SFP pulse. This is easily done by OR-ing SFP 228 and MWID 327, the output of the MAX_WIDTH counter, to the input AND gate 330 to SFP_CNT counter 332. Then a fast pileup is counted as two events, once when its SFP is generated and once when MWID goes high. This increased accuracy is particularly important in analysis applications, where it is desired to determine the quantity of one component in the presence of greatly varying amounts of other components. Obtaining this accuracy requires more accurate dead time corrections which, in turn, require more accurate ICR and livetime measurements. By using the more accurate ICR structure and the livetime counter described below in Section 3.3.10, the present invention spectrometer can attain excellent accuracy in such applications without complex external computations to mathematically correct the measured ICR to get an accurate true ICR estimate.

3.3.8. Livetime Counter Implementation

Figure 12:
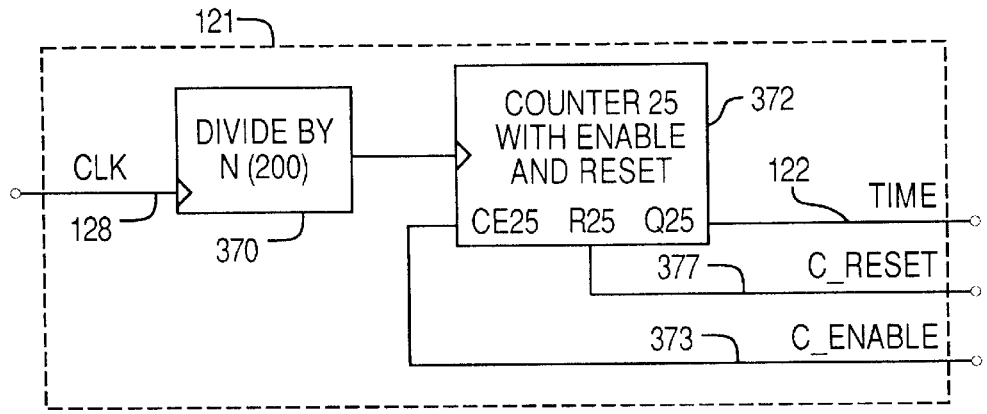
FIG. 12 is a circuit schematic of a representative embodiment of the livetime counter hardware block of FIG. 4.

The livetime counter simply counts a divided down system clock whenever it is enabled by the DSP 27. FIG. 12 shows a specific implementation. The system clock CLK 128, which runs at 20 MHz, is divided by 200 by a counter 370 and then fed to the clock input of a 30 bit counter 372. The clock enable input CE25 of this counter is enabled via a signal line C_Enable 373 from the DSP 27 whenever it is accepting pulses for processing. When pulse processing is completed, the DSP writes a 0 to C_Enable 373 and can then read the elapsed livetime as the signal TIME 122 from output Q25[29:0] of counter 372. The DSP then resets the counter using the Reset signal 377 to reset input R25. Since the divided clock runs at 100 kHz, timing accuracy of 10 $\mu$s is achieved, which is 0.001% for 1 second counting times. The division ratio of counter 370 and number of bits in counter 372 may be readily adjusted to achieve other accuracies for other common counting periods.

The time measured by livetime counter 121 is extremely useful when quantitative accuracy is required. As will be seen in the discussion of Section 4, the digital spectrometer operates in a manner that sometimes precludes collecting counts (as during preamplifier resets or out-of-range conditions). Since the number of such precluded periods, and their duration, cannot be accurately computed from count measurements, it is necessary to directly measure the "count-time" during which the system is actually counting. This number plus the number of input counts recorded can then be used to compute the true input count rate and hence the system's deadtime and livetime.

3.3.9. Peak Width at Half Height Inspector

Figure 13A:
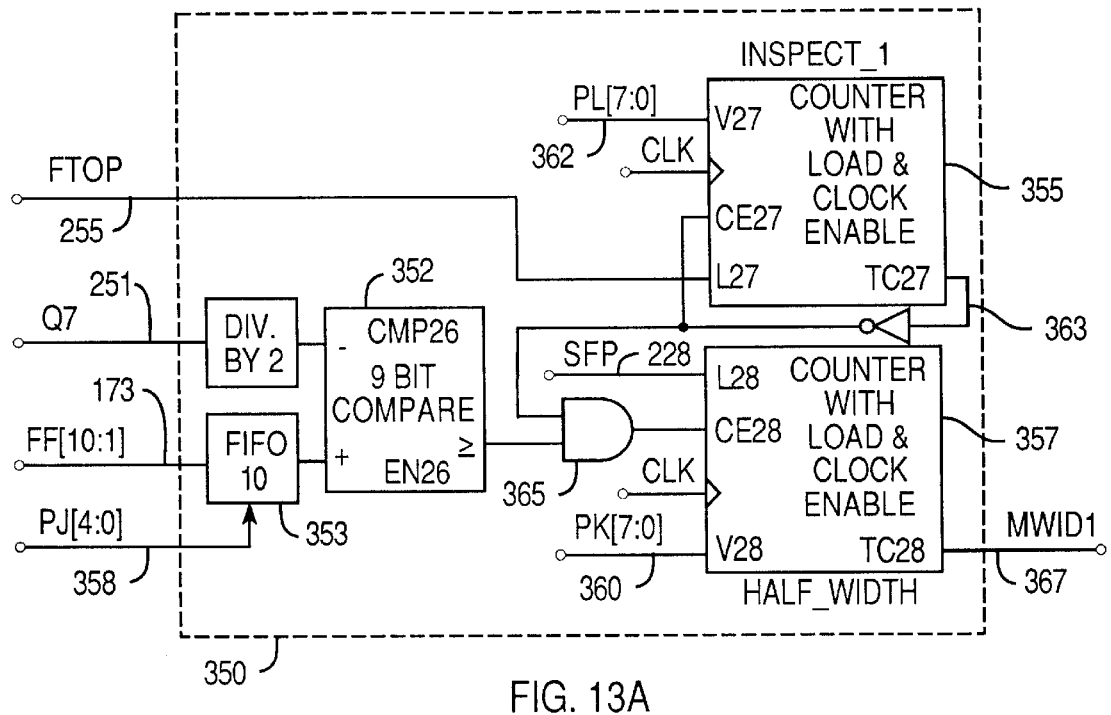
FIG. 13A is a circuit schematic of a representative embodiment of a Pileup Inspector which measures fast peak widths at their half heights.

Under some circumstances, as noted in Section 3.3.4.3, the maximum peak width inspector 242 may not be fully adequate as a means for checking for fast peak pileup. In particular, when peaks of greatly differing heights are present, the width test parameter PE[7:0] 323 must be set essentially to $2L_f+G_f$ to accommodate the base widths of the highest peaks. When this is true, peaks which are only 2 to 3 times the fast peak detection threshold 195 can pile up without being detected because their individual widths at threshold crossing are significantly less than parameter PE[7:0] 323. Under these circumstances the circuit block 350 of FIG. 13A, which offers superior performance but has a higher part count, can be substituted for block 242, the maximum fast peak width inspector, in the pileup checker 108. This circuit works by capturing the fast peak's maximum value and measuring its width at one half that value. Because the measurement threshold is adjusted on a pulse by pulse basis, the technique's accuracy is independent of pulse peak height and, in particular, is capable of detecting pileups between low amplitude pulses in a signal stream which also includes significant numbers of large amplitude pulses.

Figure 13B:
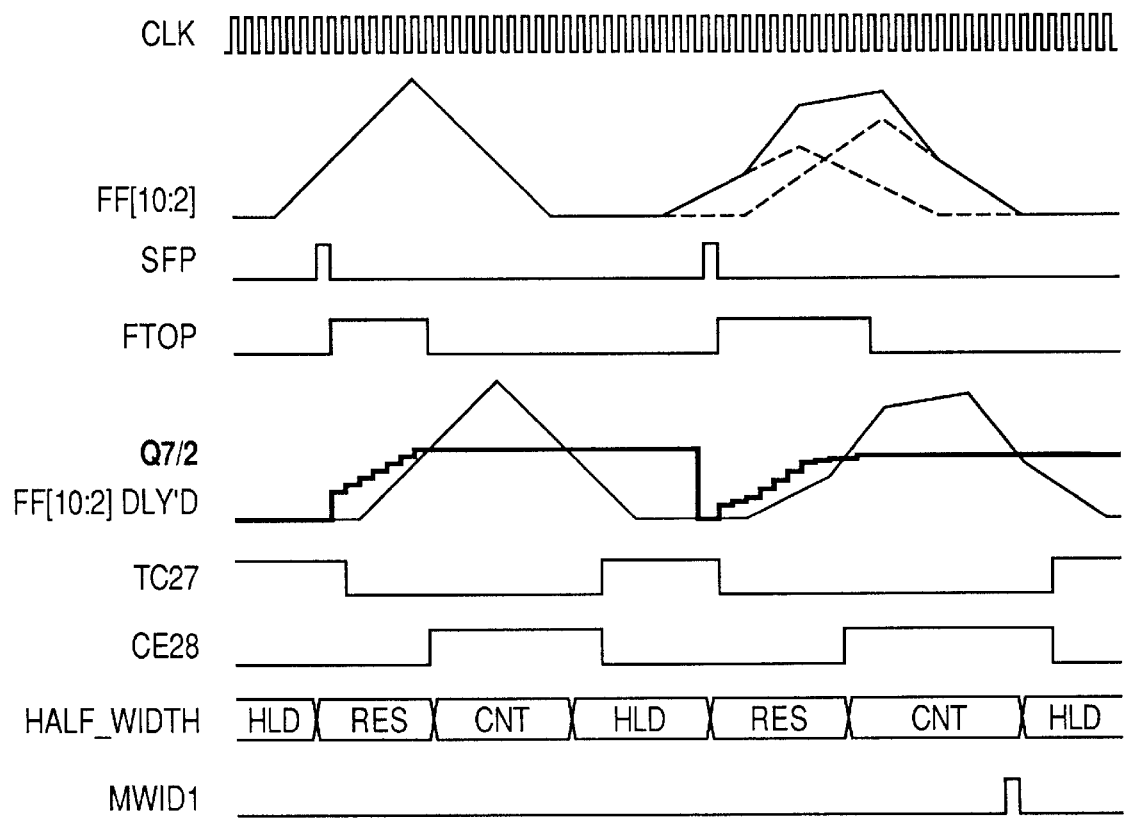
FIG. 13B is a timing diagram illustrating the operation of the circuitry of FIG. 13A.

The major elements of circuit block 350 in the specific implementation are a 9-bit comparator 352, a 10-bit FIFO 353, and two counters: the Inspect_1 counter 355 and the Half_Width counter 357. Traces of the signals associated with its operation are shown in FIG. 13B.

The positive input to comparator 352 consists of the high order 10 bits of the signal output FF[11:0] 173, which are delayed approximately $L_f+G_f$ CLK cycles by FIFO 353 according to the parameter PJ[4:0] 358. The negative input to comparator 352 is the signal Q7 251 (from buffer 250) divided by 2. This division is simple, consisting merely of shifting the numbering of the signal lines in Q7 251 by one place (i.e., the 0 bit into FIFO 353 is Q7[1], etc.). As will become apparent in the following discussion, choosing this division ratio to be 2, 4 or some other number is a trade-off, since sensitivity to both width and noise fluctuations increases as the division ratio increases.

Operation of circuit block 350 begins when a fast peak is detected and the signal SFP 228 loads Half_Width counter 357 with parameter PK[7:0] 360, the 2's complement of the maximum allowed peak half width. Immediately following SFP, the signal FTOP 255 goes to 1 and stays 1 until the maximum value in the fast peak has been detected. During this period the 2's complement inspection time parameter PL[7:0] 362 is continuously reloaded into the Inspect_1 counter 355, whose overflow signal TC27 363 goes to 0. This signal, inverted, is fed back to the counter's clock enable CE27. Thus, once signal FTOP 255 returns to 0, the Inspect_1 counter 355 counts up to 0, overflows, and halts. The inverted overflow signal TC27 363, via AND gate 365 to the clock enable CE 28, is a necessary condition for Half_Width counter 357 to count.

The other necessary condition for Half_Width counter 357 to count is for the delayed fast peak signal FF[10:1] 173 to exceed Q7 251 divided by 2, as determined by comparator 352. FF[10:1] has to be delayed because the comparison cannot begin until the peak maximum has been captured. This time is short compared to the slow channel filtering time, however, and there is no problem completing this test before the slow channel pileup test is completed (Interval_1 counter 260 times out). Thus, while FF[10:1] exceeds Q7/2, Half_Width counter 357 counts. If the width of the region where FF[10:1] exceeds Q7/2 is less than the value set by parameter PK[7:0] 360, then nothing happens. If it is greater, then Half_Width counter 357 overflows and its output TC28 generates a pulse, the signal MWID1 367, as shown in FIG. 13B. This signal is connected to the CLR16 of flipflop FF16 265, substituting for the signal MWID 327 in FIG. 10A.

3.3.10. Combining the Two Peak Width Inspection Circuits

The two peak width inspection circuits, as shown in blocks 242 and 350 have somewhat different capabilities when operating with a pulse stream that includes peaks of greatly differing amplitudes. The max_width inspector 242, as noted above, looks for pulses which exceed the basewidth ($2L_f+G_f$) of the fast filter. Therefore it is sensitive both to pileups of two large pulses or a large pulse and a small pulse, since either of these combinations will have an excessively wide width at the threshold 195. It is not sensitive to pairs of small pulses closely spaced enough so that their width at threshold is less than the basewidth of a large pulse.

The width at half-height inspector 350, on the other hand, is sensitive to pileups of pulses of comparable heights, independent of what that height is, because its test threshold is adjusted on a pulse-by-pulse basis. It is not so sensitive to pileups of pulses of greatly differing heights because the smaller pulse will not have a large effect on the half width of the larger.

Therefore, in spectroscopy situations where pileup is a critical issue and the additional circuitry is justifiable, both inspection circuits should be employed, with their outputs OR-ed together and the resultant signal replacing the signal MWID 327 in FIG. 10A. This will typically not be the case for XAS experiments of the type discussed in the Background section, where the x-rays are all of approximately the same energy. However, in situations such as spectroscopic assays for trace elements in complex matrices, where there are many x-ray energies of widely differing amplitudes, the combined inspection technique offers important advantages over single inspection techniques.

4. FiPPI Timing Capability

Figure 14:
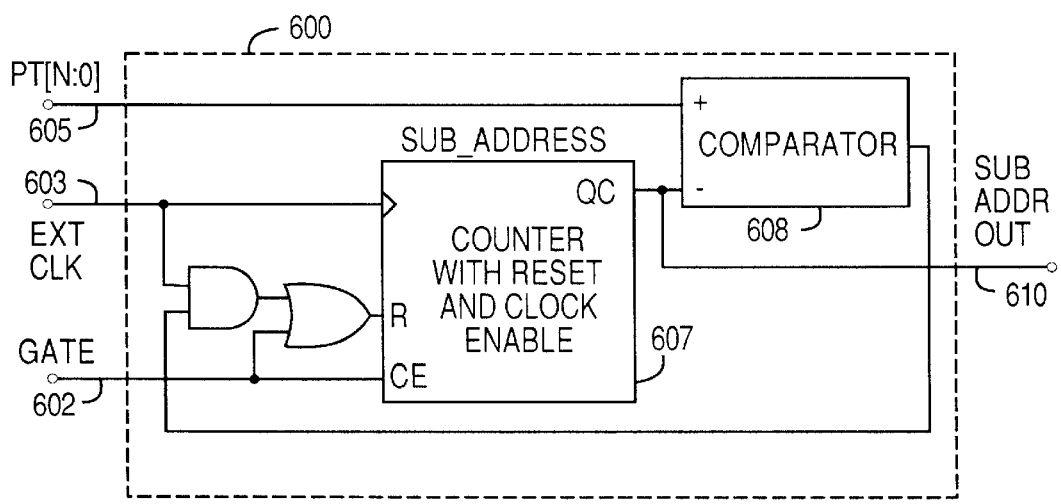
FIG. 14 is a circuit schematic of a representative embodiment of an optional Sub-Address Generator block in FIG. 4.

Because the FiPPI is digitally implemented and driven by a system clock, it has time based capability which is not readily available to analog spectrometers. FIG. 14 shows a Sub_Address Generator circuit module which allows this capability to be tapped in two different ways. This Sub_Address Generator 600 accepts two inputs from an external experiment: a Gate 602 and an External Clock EXT CLK 603. The parameter PT[N:0] 605 is supplied from the DSP 27 is the same way as the other FiPPI control parameters. The Counter 607 is enabled whenever the Gate 402 is positive and then counts on positive going transitions of the External Clock 603. Whenever its output QC reaches the value set by PT[N:0] 605, the output of the comparator 608 goes to 1 and the counter is reset on the next transition of the EXT CLK 603. The counter is also reset any time the Gate 602 makes a positive transition. The Sub_Address Generator 600 thus generates a series of values from 0 to PT[N:0] on sequential transitions of EXT CLK 603. These are output as SUB ADDR OUT 610, which is read by the DSP 27 each time the other FiPPI outputs (e.g. PKVAL 117, PLOUT 119, etc.) are read. Thus a time based sub_address can be associated with each valid pulse identified and output by the FiPPI.

This circuit or variants of it can be used in several different ways experimentally. The first technique collects data in phase with some experimental parameter. As an example, consider collecting x-ray data from a high TC superconductor which is being cycled between its normal and superconducting states. This state can be determined by its resistivity, which cycles between zero and a finite value and which can, in turn be converted into the digital signal levels 0 and 1. Then, if PT[N:0] is 1 and the resistivity signal is used as the EXT CLK 603, SUB ADDR OUT 610 will also cycle between 0 and 1, depending on the superconductor's state. It is then an easy matter to divide the DSP 27's spectrum memory into 2 halves and place incoming x-ray energy values into one or the other, depending on the value of SUB ADDR OUT 610. Because the FiPPI clock runs at 20 MHz, EXT CLK can run quite rapidly. The method is particularly advantageous, compared to simply taking spectra at two temperatures sequentially, when the spectra take a long time to collect and there are other laboratory variables which might introduce some kind of drift (1/f noise). The method is easily extended to larger numbers of spectra by increasing PT[N:0]. Experimentally this might allow, for example, data to be collected as a function of pressure as a sample is run through a repeating pressure cycle.

By setting PT[N:0] to a very large value, or by disabling the Comparator 608, the Sub_Address Generator 600 can be used to collect time resolved spectral data from a repeating experiment. As an example, one might wish to collect x-ray spectral data from a protein after it has been briefly illuminated by a laser. In this mode the Gate 602 would switch to 1 each time the laser flashed and stay high for some desired collection duration. EXT CLK 603 would be driven by a pulse generator pulsing at the desired sampling interval, and would result in SUB ADDR OUT 610 values running from 0 to M, where M would equal the collection duration divided by the sampling interval. The DSP can then be programmed to accept only x-ray energy values lying in a selected energy band (much like an SCA) and instead construct a spectrum of number of accepted counts found versus Sub_Address value. In this example, the FiPPI 25 and DSP 27 act to essentially combine the actions of an SCA and a multi-channel scaler, with only x-rays in a single energy band being binned as a function of time. By flashing the laser a large number of times, statistics on fluorescence yield vs time can be built up to any desired level of precision.

These two examples are clearly extremes. In one case a small number (2) of spectra with a large number of energy bands are collected. In the other it is a large number of spectra with a small number of energy bands (1). Given sufficient DSP memory, the method is easily extended to collect intermediate cases: that is, an arbitrary number of time resolved spectra containing an arbitrary number of energy bands, with each valid x-ray being binned according to its pair of values [Energy, SUB ADDR OUT].

5. Conclusion

In conclusion it can be seen that the present invention provides a physically compact, low cost, high speed method and apparatus for processing the pulse signals from a detector-preamplifier system and extracting their pulse amplitudes while implementing several additional important spectrometry functions, including making several tests for pulse pileup, measuring incoming count rate, and accurately determining system livetime. Moreover, the method allows simple and direct digital control over all control parameters, greatly simplifying its interface to a computer and the automation of all spectrometry functions. Because the method is digitally based, it allows pulses to be binned based on time related values, as well as on their amplitudes, if desired.

While the above is a complete description of specific embodiments of the invention, various modifications, alternative constructions, and equivalents may be used. As a first example, while the specific embodiment was implemented in an FPGA using 10 bit input data, it could readily be migrated to an application specific integrated circuit or extended to work with other data word lengths. Further, while the specific embodiment was designed to operate with the output of a detector/preamplifier system intended for x-ray or γ-ray spectroscopy, the invention could provide similar processing for step-like pulses in an electronic signal from whatever source. Therefore, the above description should not be taken as limiting the scope of the invention as defined by the appended claims.

What is claimed is:

1. A digital combinatorial logic circuit for analyzing a digital representation of an electronic signal containing step-like pulses, which arrive at an average input rate R, to provide estimates of the amplitudes of at least some of said step-like pulses, said representation having been created by digitizing the electronic signal with an analog-to-digital converter (ADC) operating at a sampling frequency S which is greater than R, the representation being referred to as the digitized input signal, the circuit being clocked at frequency S or a multiple thereof, the circuit comprising:

a digital shaping filter receiving the digitized input signal and providing an output signal referred to as the filtered signal;

a pulse detector receiving the digitized input signal and providing an output signal representing the detection of a pulse in the digitized input signal;

an output buffer coupled to said digital shaping filter and operable to capture a value of said filtered signal in response to a trigger signal; and a timing circuit coupled to said pulse detector and to said output buffer, said timing circuit providing a trigger signal in response to the detection of a pulse, said trigger signal being delayed relative to said output signal from said pulse detector by an amount that depends on at least one characteristic of said digital shaping filter.

2. The circuit of claim 1 wherein the electronic signal containing step-like pulses is from a preamplifier whose input is a photon or particle detector and wherein the amplitudes of the step-like pulses represent the energies of the photons or particles absorbed in the detector.

3. The circuit of claim 1, and further comprising:

a decimator, coupled between said digitized input signal and said digital shaping filter, which decimator provides averages of N successive digitized input signal values at 1/N of the digital input signal sampling frequency S; and a 1/N clock divider controlling said digital shaping filter.

4. The circuit of claim 1 wherein said digital shaping filter is a trapezoidal filter characterized by a peaking time of L clock cycles and a flattop time of G clock cycles and which, at each clock cycle i, accepts a data value $d_i$ and produces a filtered output value $T_{i-3}$, said digital shaping filter comprising:

first and second digital subtracters, each having positive and negative inputs and an output;

first and second FIFO memories, each having an input and an output;

said first FIFO memory being capable in a single clock cycle of accepting the value $d_i$ and recalling the value $d_{i-L}$ that was input L clock cycles earlier;

said second FIFO memory being capable in a single clock cycle of accepting the value $d_i$ and outputting the value $d_{i-L-G}$ that was input L+G clock cycles earlier; and an accumulator having first and second inputs and an output;

said digitized input signal being communicated to said first FIFO memory's input and to said first subtractor's positive input, and said first FIFO memory's output being coupled to said first subtractor's negative input, so that when a given value $d_i$ of said digitized input signal is input to said digital shaping filter on a given clock cycle, the output $s_i = d_i - d_{i-L}$ is produced at the first subtracter's output on the first cycle following said given clock cycle;

said first subtracter's output being coupled to said second FIFO memory's input and said second subtracter's positive input, and said second FIFO memory's output being coupled to said second subtractor's negative input, so that when $s_i$ appears on said first subtracter's output, $t_i = d_i - d_{i-L} - d_{i-L-G} + d_{i-2L-G}$ appears on said second subtracter's output on the second cycle following said given clock cycle;

said accumulator's output being coupled to said accumulator's first input, and said second subtracter's output being coupled to said accumulator's second input, so that when $t_i$ appears on said second subtracter's output, $T_i = T_{i-1} + d_i - d_{i-L} - d_{i-L-G} + d_{i-2L-G}$ appears on said accumulator's output on the third cycle following said given clock cycle, which corresponds to the desired trapezoidal digital filter function, subjected to a 3 clock cycle index shift corresponding to the three single cycle operations which comprise the filter.

5. The circuit of claim 1 wherein:

said digital shaping filter, referred to as the first shaping filter, is characterized by at least one time constant $\tau_s$; and said pulse detector comprises a second digital shaping filter characterized by at least one time constant $\tau_f$, where $\tau_f$ is significantly shorter than $\tau_s$.

6. The circuit of claim 1 wherein said output buffer includes a FIFO memory.

7. The circuit of claim 1 wherein said pulse detector comprises:

an additional shaping filter to produce an additional filtered signal; and a peak detector coupled to said additional shaping filter.

8. The circuit of claim 7 wherein said peak detector comprises:

a discriminator that determines which values of the additional filtered signal exceed a threshold value, which threshold value may be an adjustable parameter; and a counter which identifies as a fast peak any instances wherein M consecutive digital values output by the fast digital filter exceed the threshold value, where the value M may also be an adjustable parameter.

9. The circuit of claim 1, and further comprising:

a "slow" pileup inspector, coupled between said pulse detector and said timing circuit, which measures intervals between successive pairs of signals output from said pulse detector, and prevents said timing circuit from generating said trigger signal when a measured interval is inadequate to allow said digital shaping filter to produce valid estimates of the amplitudes of the associated pulses.

10. The circuit of claim 1, and further comprising:

a "fast" pileup inspector coupled between said pulse detector and said timing circuit, which determines from the output signal of said pulse detector that a pair of pulses arrived so close together that they could not be resolved as separate pulses by said pulse detector, and prevents said timing circuit from generating said trigger signal.

11. The circuit of claim 1, and further comprising:
a counter, coupled to said pulse detector, which counts the number of pulses detected by said pulse detector.

12. The circuit of claim 1, and further comprising:
means for determining if the filtered signal has returned to a baseline value and, if requested by an external device, for generating a trigger signal to said output buffer to cause capture of said filtered signal.

13. The circuit of claim 1 wherein said output buffer is coupled to an external device, and further comprising:
a counter for measuring system "livetime" by counting clock cycles when said external device is available to accept amplitude estimates captured by said output buffer.

14. A method of operating digital combinatorial logic, referred to as the FiPPI, to analyze a digital representation of an electronic signal containing step-like pulses, which arrive at an average rate R, to provide estimates of the amplitudes of at least some of said step-like pulses, said representation having been created by digitizing the electronic signal with an analog to digital converter (ADC) operating at a sampling frequency S which is greater than R, the representation being referred to as the digitized input signal, and the FiPPI being clocked at frequency S or a multiple thereof, the method comprising the steps of:
digitally filtering the digitized input signal and providing an output signal referred to as the filtered signal, the filtering being characterized by a set of parameters including at least one time parameter;
detecting pulses in the digitized input signal; and
in response to a detected pulse, capturing a value of the filtered signal, said value being captured at a time delayed relative to said detection of the pulse by an amount that depends on at least one parameter of said set.

15. The method of claim 14 wherein the electronic signal containing step-like pulses is from a preamplifier whose input is an photon or particle detector and wherein the amplitudes of the step-like pulses represent the energies of the photons or particles absorbed in the detector.

16. The method of claim 14, and further comprising the step of capturing a corresponding value of the digitized input signal.

17. The method of claim 14 wherein:
said digitally filtering step includes a decimation step of averaging N successive digitized input signal values; and
said filtering step is clocked at 1/N of the digital input signal sampling frequency S.

18. The method of claim 14 wherein said digital filtering step provides trapezoidal filtering which operates in three clock cycles without the use of either multiplication or division functions and the trapezoidal filter is characterized by a peaking time of L clock cycles and a flattop time of G clock cycles and, at each clock cycle i, accepts a data value $d_i$ and produces a filtered output value $T_{i-3}$, and said filtering step comprises:
applying $d_i$ to the positive input of a digital subtracter and also to the input of a FIFO memory, capable in a single clock cycle of accepting the value $d_i$ and recalling the value $d_{i-L}$ input L clock cycles earlier, whose output is connected to the negative input of the same digital subtracter to produce the output $s_i = d_i - d_{i-L}$ on the next clock cycle, and
applying $s_i$ to the positive input of a second digital subtracter and also, through a second FIFO memory that delays it by L+G clock cycles, to the negative input of the same digital subtracter to produce the output $t_i = d_i - d_{i-L} - d_{i-L-G} + d_{i-2L-G}$ on the next clock cycle, and
applying $t_i$ to one input of an accumulator, whose other input is connected to its own output, to produce the output $T_i = T_{i-1} + d_i - d_{i-L} - d_{i-L-G} + d_{i-2L-G}$ on the next clock cycle, which corresponds to the desired trapezoidal digital filter function, subjected to a 3 clock cycle index shift corresponding to the three single cycle operations which comprise the filter.

19. The method of claim 14 wherein:
said digital filtering step is characterized by at least one time constant $\tau_s$; and
said step of detecting pulses includes digitally filtering the digitized input signal in a manner characterized by at least one time constant $\tau_f$, where $\tau_f$ is significantly shorter than $\tau_s$.

20. The method of claim 14, and further comprising:
measuring intervals between successive pairs of pulses detected in said digitized input signal; and
preventing the value of said filtered signal from being captured when a measured interval is inadequate to allow said filtering step to produce valid estimates of the amplitudes of the associated pulses.

21. The method of claim 14, and further comprising:
detecting a condition, referred to as pileup, signifying the arrival of a pair of pulses so close together that they cannot be detected as separate pulses in said step of detecting pulses; and
in response to detection of said pileup condition, preventing the value of said filtered signal from being captured.

22. The method of claim 21 wherein:
said step of detecting pulses includes filtering the digitized input signal with a fast digital filter to generate an additional filtered signal and detecting a peak in the additional filtered signal; and
pileup is detected by counting the number of clock cycles until the detected peak falls back below a preset threshold and labeling as "piled up" any detected peak for which the number of counted clock cycles exceeds a preset value, where the preset value is a predetermined, adjustable parameter based on both the parameters of the fast digital filter and the input signal risetime.

23. The method of claim 21 wherein:
said step of detecting pulses includes filtering the digitized input signal with a fast digital filter to generate an additional filtered signal and detecting a peak in the additional filtered signal; and
pileup inspection is carried out by the steps of
using digital delay means to produce a delayed copy of the additional filtered signal and, for each detected peak,
capturing the maximum amplitude of the detected peak, taking a fixed fraction of the maximum amplitude,
counting the number of clock cycles the delayed copy of the detected peak exceeds the fixed fraction of its own maximum amplitude, and
labeling as "piled up" any peaks for which the number of counted clock cycles exceeds a preset value, where the preset value is also a predetermined, adjustable parameter based on both the parameters of the fast digital filter and the input signal risetime.

24. The method of claim 14 wherein:
said step of detecting pulses includes filtering the digitized input signal with a fast digital filter to generate an additional filtered signal and detecting a peak in the additional filtered signal; and the arrival time of the peak value is used to define the arrival time of the peak.

25. The method of claim 14, and further comprising:

counting the number of pulses detected by said pulse detector to provide an accurate measure of the input pulse arrival rate.

26. The method of claim 14, and further comprising:

determining if the filtered signal has returned to a baseline value; and if requested by an external device, enabling capture of said filtered signal notwithstanding the fact that no pulse has been detected.

27. The method of claim 14 wherein said captured values are communicated to an external device, and further comprising:

measuring the time when the external device is available to accept amplitude estimates captured in said capturing step.

28. The circuit of claim 1 wherein:

(a) delay buffering of the data stream at any point in the FiPPI is eliminated, excepting only that buffering logically required to implement the digital filters and the single buffer registers required to capture values for output to the external device, by:

employing, in both the fast and slow channels, time invariant filters which do not require the pulse time locations in order to operate, and arranging, by appropriate use of parallel logic tests and otherwise, for the fast channel means to complete their required operations in times less than or equal to the slow filter peaking time, where said required operations include detecting peaks, capturing the slow channel amplitude estimates to the output register, and, optionally, performing sundry pileup inspection tests, and, if one or another fast channel test cannot logically be completed in less time than the slow filter peaking time, then capturing the slow channel amplitude estimates to the output register at the appropriate time, and, if all fast channel tests complete successfully, then signaling the external device that a valid captured value is available, else doing nothing, so that the invalid captured value will be overwritten by the next value to be captured; and (b) the means for capturing values of either the unfiltered digital input signal or the output of the decimator, are comprised of:

an "intermediate" buffer, whose input is connected to either the digital input signal or decimator output, as appropriate;

an "unfiltered output" buffer, similar to the one used to capture the slow filter output, whose input is the output of the intermediate buffer;

timing circuitry so that the intermediate buffer can capture its input at a time when the input is known to be valid; and enabling circuitry so that, when said slow filter output buffer capturing step occurs, the value stored in the intermediate buffer will be transferred to the unfiltered output buffer as well; and (c) timing jitter is minimized by employing as the arrival time of a fast filter peak the arrival time of its peak value, by the addition of circuits which:

reset a buffer to zero each time a fast peak is detected; and comparing subsequent fast filter values to the value stored in the buffer; and, if the subsequent value exceeds the stored value:

replace the stored value by the subsequent value, and issue a reset pulse to those counting timers whose function is to measure time relative to the location of the detected peak, and else, do nothing; and (d) the slow filter output buffer is caused to capture the slow filter output after a specified delay by the addition of circuits which:

starting at the fast peak's arrival time, count a predetermined number of clock cycles; and then enable the output buffer to capture the output of the slow digital filter, where the predetermined number is based on the lengths of the slow and fast filters and the operations implemented in the combinatorial logic and is the number of clock cycles which elapse between the arrival time of a fast filter peak and the emergence of the point on the associated peak from the slow filter corresponding to the desired amplitude estimate; and (e) the slow pileup inspection is carried out by additional circuitry which:

counts the number of clock cycles between each detected fast filter peak and the next; and, if:

the number of clock cycles exceeds a preset number, which corresponds to the minimum number of cycles required to assure that the input signal pulse associated with the detected fast filter peak will not have trailing edge pileup in the implemented slow digital shaping filter, and no flag is set indicating that the input signal pulse has leading edge pileup, then: enables the means for capturing the slow filter output; otherwise:

disables the means for capturing the slow filter output; and sets a flag indicating that the succeeding pulse has leading edge pileup; and (f) the slow filter baseline events are captured by addition circuitry which:

counts the number of clock cycles following a detected fast filter peak; and, if the number of clock cycles reaches a preset number without the first subsequent neighbor peak being detected, which number corresponds to the minimum number of cycles required to assure that the input signal pulse associated with the detected fast filter peak will not have trailing edge pileup in the implemented slow digital noise filter; and if the counting process is then restarted and again reaches the preset number, still without the first subsequent neighbor peak being detected; then if a signal or flag is present to indicate that the external device has requested that a baseline event be collected, enables the means which capture slow filter values in the slow channel output buffer; and sets a flag or uses other appropriate means to signal the external device that this captured slow filter value is the requested baseline value; and (g) the means for measuring system "livetime" is comprised of:

a divider which divides the system clock by a preset factor N; and a counter; and means for incrementing the counter by 1 each time a pulse is emitted from the divider; and means for allowing the external device to read and re-zero the counter from time to time; and (h) the means for buffering data between the FiPPI and the external device is comprised of:

a set of buffer latches, one per each value in the set of data values to be transferred;

strobe means to cause the latches to load in parallel such a set of values at a particular clock transition determined by the FiPPI;

means for the FiPPI to set an interrupt flag to the external device on strobing the latches;

means for the external device to respond to the setting of the interrupt flag in less time than the FiPPI's slow pileup inspection time; and means for the external device to clear the interrupt when it responds to the interrupt and reads the values stored in the latches; and (i) the means for buffering data between the FiPPI and the external device is comprised of:

a set of buffer FIFO memories, one per each value in the set of data values to be transferred;

strobe means to cause the FIFO memories to load in parallel a sequence of such sets of values at a those particular clock transitions determined by the FiPPI;

means for the FiPPI to set a non-interrupt flag to the external device simultaneously on strobing the latches;

means for the external device to poll the flag and, when the flag is set, to read out all the values stored in the FIFO memories; and means for the external device to clear the non-interrupt flag after it reads the stored values.

29. The method of claim 14 wherein:

(a) the FiPPI includes two principal sections, referred to as the slow channel and the fast channel:

a slow channel, comprising: a digital "slow" shaping filter characterized by at least one time constant $\tau_s$; an output buffer; and, optionally, one or more of the following:

means for decimating the digital input signal in order to feed the digital filter averages of N successive input values at 1/N of the digital input signal data rate, and means for capturing values of either the digital input signal or the output of the decimator; and a fast channel, comprising: a digital "fast" shaping filter characterized by at least one time constant $\tau_f$, where $\tau_f$ is significantly shorter than $\tau_s$; means to inspect the output of this fast filter for the presence of peaks; means, upon detecting a fast filter peak, to cause the slow filter output buffer to capture, as the desired amplitude estimate, the slow filter output after a specified delay; and, optionally, one or more of the following:

means to inspect for "slow" pileup by measuring the intervals between successive pairs of detected fast peaks and disabling the means for capturing the slow filter output when the duration of an interval is inadequate to allow the slow filter to produce valid estimates of the amplitudes of the associated pulses; and means to inspect for "fast" pileup by detecting the presence of pulses with arrive so close together that they do not resolve as separate peaks in the fast channel and disabling the means for capturing the slow filter output under this condition as well; and means for determining if the slow filter output has returned to its baseline and, if requested by the external device, enabling the slow channel output buffer to capture the output of the slow filter; and means for counting the number of peaks detected in the fast channel to provide an accurate measure of the input counting rate; and means for measuring system "livetime" by counting clock cycles when the external device is available to accept amplitude estimates captured by the FiPPI; and (b) delay buffering of the data stream at any point in the FiPPI is eliminated, excepting only that buffering logically required to implement the digital filters and the single buffer registers required to capture values for output to the external device, by the additional steps of employing, in both the fast and slow channels, time invariant filters which do not require the pulse time locations in order to operate, and arranging, by appropriate use of parallel logic tests and otherwise, for the fast channel means to complete their required operations in times less than or equal to the slow filter peaking time, where said required operations include detecting peaks, capturing the slow channel amplitude estimates to the output register, and, optionally, performing sundry pileup inspection tests, and, if one or another fast channel test cannot logically be completed in less time than the slow filter peaking time, then capturing the slow channel amplitude estimates to the output register at the appropriate time, and, if all fast channel tests complete successfully, then signaling the external device that a valid captured value is available, else doing nothing, so that the invalid captured value will be overwritten by the next value to be captured; and (c) either the slow digital filter, the fast digital filter or both are trapezoidal filters which operate in three clock cycles without the use of either multiplication or division functions, each trapezoidal filter being characterized by a peaking time of L clock cycles and a flattop time of G clock cycles and which, at each clock cycle i, accept a data value $d_i$ and produce a filtered output value $T_{i-3}$ by the additional steps of:

applying $d_i$ to the positive input of a digital subtracter and also to the input of a FIFO memory, capable in a single clock cycle of accepting the value $d_i$ and recalling the value $d_{i-L}$ input L clock cycles earlier, whose output is connected to the negative input of the same digital subtracter to produce the output $s_{i+1}=d_i-d_{i-L}$ on the next clock cycle, and applying $s_{i+1}$ to the positive input of a second digital subtracter and also, through a second FIFO memory that delays it by L+G clock cycles, to the negative input of the same digital subtracter to produce the output $t_{i+2}=d_i-d_{i-L}-d_{i-L-G}+d_{i-2L-G}$ on the next clock cycle, and applying $t_{i+2}$ to one input of an accumulator, whose other input is connected to its own output, to produce the output $T_{i+3}=T_{i+2}+d_i-d_{i-L}-d_{i-L-G}+d_{i-2L-G}$ on the next clock cycle, which corresponds to the desired trapezoidal digital filter function, subjected to a 3 clock cycle index shift corresponding to the three single cycle operations which comprise the filter; and (d) the decimation means are provided by the additional steps of:
dividing the clock rate by N to produce a decimated clock; and summing each sequential block of N input data values; and
possibly dropping one or more of the least significant bits of the N value sums; and
passing the, possibly truncated, N value sums to the digital filter; and
supplying the decimated clock as the digital filter clock; and (e) means for capturing values of either the unfiltered digital input signal or the output of the decimator, are comprised of:
an "intermediate" buffer, whose input is connected to either the digital input signal or decimator output, as appropriate;
an "unfiltered output" buffer, similar to the one used to capture the slow filter output, whose input is the output of the intermediate buffer;
timing means so that the intermediate buffer can capture its input at a time when the input is known to be valid; and
enabling means so that, when said slow filter output buffer capturing step occurs, the value stored in the intermediate buffer will be transferred to the unfiltered output buffer as well; and (f) timing jitter is minimized by employing as the arrival time of a fast filter peak the arrival time of its peak value, by the additional steps of:
resetting a buffer to zero each time a fast peak is detected; and
comparing subsequent fast filter values to the value stored in the buffer; and,
if the subsequent value exceeds the stored value:
replacing the stored value by the subsequent value, and
issuing a reset pulse to those counting timers whose function is to measure time relative to the location of the detected peak, and
else, doing nothing; and (g) the slow filter output buffer is caused to capture the slow filter output after a specified delay by the additional steps of:
predetermining, based on the lengths of the slow and fast filters and the operations implemented in the combinatorial logic, the number of clock cycles which will elapse between the arrival time of a fast filter peak and the emergence of the point on the associated peak from the slow filter corresponding to the desired amplitude estimate; and
starting at the fast peak's arrival time, counting the predetermined number of clock cycles; and
then enabling the output buffer to capture the output of the slow digital filter; and (h) the slow pileup inspection is carried out by the additional steps of:
counting the number of clock cycles between each detected fast filter peak and the next; and,
if:
the number of clock cycles exceeds a preset number, which corresponds to the minimum number of cycles required to assure that the input signal pulse associated with the detected fast filter peak will not have trailing edge pileup in the implemented slow digital shaping filter, and
no flag is set indicating that the input signal pulse has leading edge pileup,
then: enabling the means for capturing the slow filter output; otherwise:
disabling the means for capturing the slow filter output; and
setting a flag indicating that the succeeding pulse has leading edge pileup; and (i) the means for counting the number of peaks detected in the fast channel are comprised of:
a counter; and
means for incrementing the counter by 1 each time a peak is detected in the fast channel; and
means for allowing the external device to read and re-zero the counter from time to timer; and (j) the slow filter baseline events are captured by the additional steps of:
counting the number of clock cycles following a detected fast filter peak; and,
if the number of clock cycles reaches a preset number without the first subsequent neighbor peak being detected, which number corresponds to the minimum number of cycles required to assure that the input signal pulse associated with the detected fast filter peak will not have trailing edge pileup in the implemented slow digital noise filter; and
if the counting process is then restarted and again reaches the preset number, still without the first subsequent neighbor peak being detected; then
if a signal or flag is present to indicate that the external device has requested that a baseline event be collected, enabling the means which are used to capture slow filter values in the slow channel output buffer; and
setting a flag or using other appropriate means to signal the external device that this captured slow filter value is the requested baseline valuer; and (k) the means for measuring system "livetime" is comprised of:
a divider which divides the system clock by a preset factor N; and
a counter; and
means for incrementing the counter by 1 each time a pulse is emitted from the divider; and
means for allowing the external device to read and re-zero the counter from time to timer; and (l) the means for buffering data between the FiPPI and the external device is comprised of:
a set of buffer latches, one per each value in the set of data values to be transferred;
strobe means to cause the latches to load in parallel such a set of values at a particular clock transition determined by the FiPPI;
means for the FiPPI to set an interrupt flag to the external device on strobing the latches;
means for the external device to respond to the setting of the interrupt flag in less time than the FiPPI's slow pileup inspection time; and
means for the external device to clear the interrupt when it responds to the interrupt and reads the values stored in the latcher; and (m) the means for buffering data between the FiPPI and the external device is comprised of:

a set of buffer FIFO memories, one per each value in the set of data values to be transferred;

strobe means to cause the FIFO memories to load in parallel a sequence of such sets of values at a those particular clock transitions determined by the FiPPI;

means for the FiPPI to set a non-interrupt flag to the external device simultaneously on strobing the latches;

means for the external device to poll the flag and, when the flag is set, to read out all the values stored in the FIFO memories; and means for the external device to clear the non-interrupt flag after it reads the stored values.

* * * * *